United States Patent
Uttech et al.

(10) Patent No.: US 8,926,253 B2
(45) Date of Patent: Jan. 6, 2015

(54) PLATFORM LIFT TRAILER AND COUPLING SYSTEM

(75) Inventors: Scott K. Uttech, New Berlin, WI (US); William W. Belson, III, Hartland, WI (US); Andrew A. Bayer, Oconomowoc, WI (US); Timothy G. Schwarz, Delafield, WI (US); Adam C. Hooper, Iron Ridge, WI (US)

(73) Assignee: Bruno Independent Living Aids, Inc., Oconomowoc, WI (US)

( * ) Notice: Subject to any disclaimer, the term of this patent is extended or adjusted under 35 U.S.C. 154(b) by 144 days.

(21) Appl. No.: 13/639,645

(22) PCT Filed: Apr. 13, 2011

(86) PCT No.: PCT/US2011/032352
§ 371 (c)(1),
(2), (4) Date: Oct. 5, 2012

(87) PCT Pub. No.: WO2011/130431
PCT Pub. Date: Oct. 20, 2011

(65) Prior Publication Data
US 2013/0022434 A1    Jan. 24, 2013

Related U.S. Application Data

(60) Provisional application No. 61/324,169, filed on Apr. 14, 2010.

(51) Int. Cl.
*B60P 3/06* (2006.01)
*B60P 1/44* (2006.01)
*B66F 9/065* (2006.01)
*B66F 9/075* (2006.01)

(52) U.S. Cl.
CPC .............. *B60P 1/4414* (2013.01); *B66F 9/065* (2013.01); *B66F 9/07504* (2013.01); *Y10S 414/134* (2013.01)
USPC .......................................... 414/462; 414/921

(58) Field of Classification Search
USPC .......... 414/462, 482, 483, 546, 921; 224/488, 224/495, 502, 504, 508, 519, 524
See application file for complete search history.

(56) References Cited

U.S. PATENT DOCUMENTS

| | | |
|---|---|---|
| 3,208,168 A | 9/1965 | Henschen |
| 3,436,069 A | 4/1969 | Henschen |

(Continued)

FOREIGN PATENT DOCUMENTS

KR    10-2009-0018244 A    2/2009

OTHER PUBLICATIONS

Notification of Transmittal of the International Search Report and the Written Opinion of the International Searching Authority for International Application No. PCT/US2011/032352; KIPO mailing date Dec. 27, 2011 (2 pgs).

(Continued)

*Primary Examiner* — Kaitlin Joerger
(74) *Attorney, Agent, or Firm* — K&L Gates LLP

(57) ABSTRACT

A platform lift trailer includes a chassis to which a lift device is mounted. The chassis is configured to be coupled to a standard motor vehicle trailer hitch or the like using a coupler. Some embodiments of the coupler provide protection against larges torsional forces applied between a motor vehicle and coupled trailer when they are angularly displaced relative to one another. One or more ground-engaging wheel assemblies are mounted to the chassis to assist in supporting the weight of the lift and any cargo thereon. The platform lift trailer is highly adaptable so that a wide variety of lifts can be mounted to the platform lift trailer and thus to smaller motor vehicles. Adaptation of mobility lifts and the like to a larger array of motor vehicles is therefore possible. One or more embodiments of a trailer coupler use torque-limiting apparatus so that vertical angular displacements of a motor vehicle and a coupled trailer do not apply large forces directly between the motor vehicle and the trailer. Instead, the coupler torque-limiting structure limits such forces using a biasing means such as a spring or the like to accommodate or limit torsional forces applied between the motor vehicle and the trailer. The biasing means also can limit the maximum angular displacement allowed between the motor vehicle and coupled trailer.

16 Claims, 26 Drawing Sheets

(56) References Cited

U.S. PATENT DOCUMENTS

| | | | |
|---|---|---|---|
| 3,993,207 | A | 11/1976 | Jones |
| 4,010,826 | A | 3/1977 | Jones |
| 5,277,450 | A | 1/1994 | Henschen |
| 5,664,796 | A * | 9/1997 | Huyzers .................. 280/400 |
| 5,846,120 | A | 12/1998 | Barton, Jr. |
| 5,947,385 | A * | 9/1999 | Lanerd et al. ............. 239/172 |
| 5,984,342 | A | 11/1999 | Ysker |
| 6,033,177 | A | 3/2000 | Kooima |
| 6,203,266 | B1 | 3/2001 | Savaria et al. |
| D477,797 | S | 7/2003 | McCoy et al. |
| 6,585,474 | B1 | 7/2003 | Kameda |
| 6,648,579 | B2 | 11/2003 | Vartanian, Sr. |
| 6,655,895 | B1 | 12/2003 | Dahl |
| 6,659,491 | B2 | 12/2003 | Green |
| 6,692,215 | B1 * | 2/2004 | Panzarella et al. ......... 414/462 |
| 6,726,435 | B1 | 4/2004 | Williams et al. |
| 6,729,827 | B1 | 5/2004 | Williams et al. |
| 6,817,677 | B1 | 11/2004 | Beiler |
| 6,830,423 | B1 | 12/2004 | Williams et al. |
| 6,837,666 | B1 | 1/2005 | Panzarella et al. |
| 6,887,027 | B2 | 5/2005 | O'Leary et al. |
| D523,779 | S | 6/2006 | Mattila |
| 7,188,848 | B2 | 3/2007 | Chapman |
| 7,387,308 | B2 | 6/2008 | Williamson |
| 7,396,202 | B1 * | 7/2008 | Panzarella et al. ......... 414/542 |
| D578,041 | S | 10/2008 | Prusmack |
| 7,594,556 | B1 | 9/2009 | Panzarella et al. |
| 7,686,562 | B2 * | 3/2010 | Panzarella et al. ......... 414/462 |
| D619,324 | S | 7/2010 | DiGiovanni et al. |
| 7,815,413 | B2 * | 10/2010 | Fisher et al. ............... 414/812 |
| 7,832,745 | B2 * | 11/2010 | Rauch, Jr. .................... 280/86 |
| 8,042,655 | B1 * | 10/2011 | Ablabutyan et al. ........ 187/200 |
| D653,833 | S | 2/2012 | Thompson et al. |
| 8,678,737 | B2 * | 3/2014 | DiGiovanni et al. ....... 414/462 |
| 2001/0026756 | A1 * | 10/2001 | Mortimore .................. 414/556 |
| 2003/0113196 | A1 | 6/2003 | O'Leary et al. |
| 2005/0019125 | A1 | 1/2005 | Panzarella et al. |
| 2005/0079037 | A1 | 4/2005 | Boyd |
| 2005/0105995 | A1 | 5/2005 | Freet et al. |
| 2005/0285362 | A1 | 12/2005 | Williamson |
| 2006/0097482 | A1 | 5/2006 | Cumbie |
| 2006/0210381 | A1 | 9/2006 | Pollnow et al. |
| 2008/0211289 | A1 | 9/2008 | Beiler et al. |
| 2008/0250984 | A1 | 10/2008 | Panzarella et al. |
| 2009/0146388 | A1 | 6/2009 | Rauch, Jr. |
| 2009/0194968 | A1 | 8/2009 | Ardagna |
| 2009/0278329 | A1 | 11/2009 | VanDenberg et al. |
| 2009/0309330 | A1 | 12/2009 | Ryan |
| 2009/0309331 | A1 | 12/2009 | Ryan |

OTHER PUBLICATIONS

International Search Report, International Application No. PCT/US2011/032352; KIPO mailing date Dec. 27, 2011 (5 pgs).

Written Opinion of the International Searching Authority, International Application No. PCT/US2011/032352; KIPO mailing date Dec. 27, 2011 (8 pgs).

* cited by examiner

PLATFORM LIFT TRAILER AND COUPLING SYSTEM

PRIORITY CLAIM AND CROSS-REFERENCE TO RELATED APPLICATIONS

This application claims the benefit of and priority to prior filed and co-pending U.S. Provisional Application No. 61/324,169 filed Apr. 14, 2010, entitled CASTER-SUPPORTED LIFT DEVICE, the entire disclosure of which (including the Appendix) is incorporated herein by reference in its entirety for all purposes.

TECHNICAL FIELD

Embodiments of the present invention relate generally to apparatus, systems, methods, techniques, and the like for platform lift trailers and relate generally to coupling systems therefor, including coupling a ground-supported (e.g., wheeled, wheel-supported, caster-supported or the like) lift device to a motor vehicle. Several embodiments specifically address use of a wheel-supported lift device for loading, storing, transporting and/or unloading a mobility device (e.g., a scooter, power chair, etc.), including embodiments in which the wheeled support is configured for use at road and/or highway speeds in transporting cargo such as a mobility device. Other embodiments include a trailer coupler that permits angular deflection between the trailer and a motor vehicle to which the trailer is coupled, wherein the coupler isolates and/or limits forces that would otherwise be applied between the trailer and the motor vehicle within a range of angular deflections.

BACKGROUND

Many motor vehicles are too small or otherwise ill-equipped or unable to support an externally-mounted, cantilevered lift coupled directly to and supported by a trailer hitch or the like. Such limited weight and/or other performance characteristics of these motor vehicles means that individuals who require mobility assistance in the form of mobility devices such as scooters, power chairs and the like are unable to transport such mobility devices unless they have access to a larger and/or better-equipped vehicle. Apparatus, systems, methods, techniques, etc. providing improved mobility device transfer for smaller motor vehicle would represent a significant advancement in the art.

SUMMARY

The present invention will be readily understood by referring to the following detailed description in conjunction with the accompanying drawings. A platform lift trailer includes a chassis constituting mounting and support structure to which a lift device (e.g., a mobility lift used to load, store, transport and unload mobility devices like scooters, power chairs and the like) is mounted. The chassis is configured to be coupled to a standard motor vehicle trailer hitch or the like using a platform lift trailer coupler. Some embodiments of the coupler provide protection against larges forces that might be applied between a motor vehicle and coupled trailer when they are angularly displaced relative to one another. To aid in supporting the weight of the lift (whether unloaded or loaded), one or more ground-engaging wheel assemblies are mounted to the chassis to assist in supporting the weight of the lift and any cargo (e.g., a mobility device) thereon, while not introducing an undesirable large additional weight to the back of the motor vehicle. Embodiments of the present invention thus permit adaptation of mobility lifts to a larger array of motor vehicles than otherwise possible. Also, embodiments of the present invention are highly adaptable so that a wide variety of lifts can be mounted to smaller motor vehicles. Other embodiments include a trailer coupler that uses a torque-limiting apparatus so that vertical angular displacements of the motor vehicle and a trailer coupled thereto do not apply large forces directly between the motor vehicle and the trailer. Instead, the torque-limiting coupler structure limits such forces using a biasing means such as a spring or the like to accommodate torsional forces applied between the motor vehicle and the trailer.

BRIEF DESCRIPTION OF DRAWINGS

The present invention will be readily understood by the following detailed description in conjunction with the accompanying drawings, wherein like reference numerals designate like structural elements, and in which.

DETAILED DESCRIPTION

Figure 1:
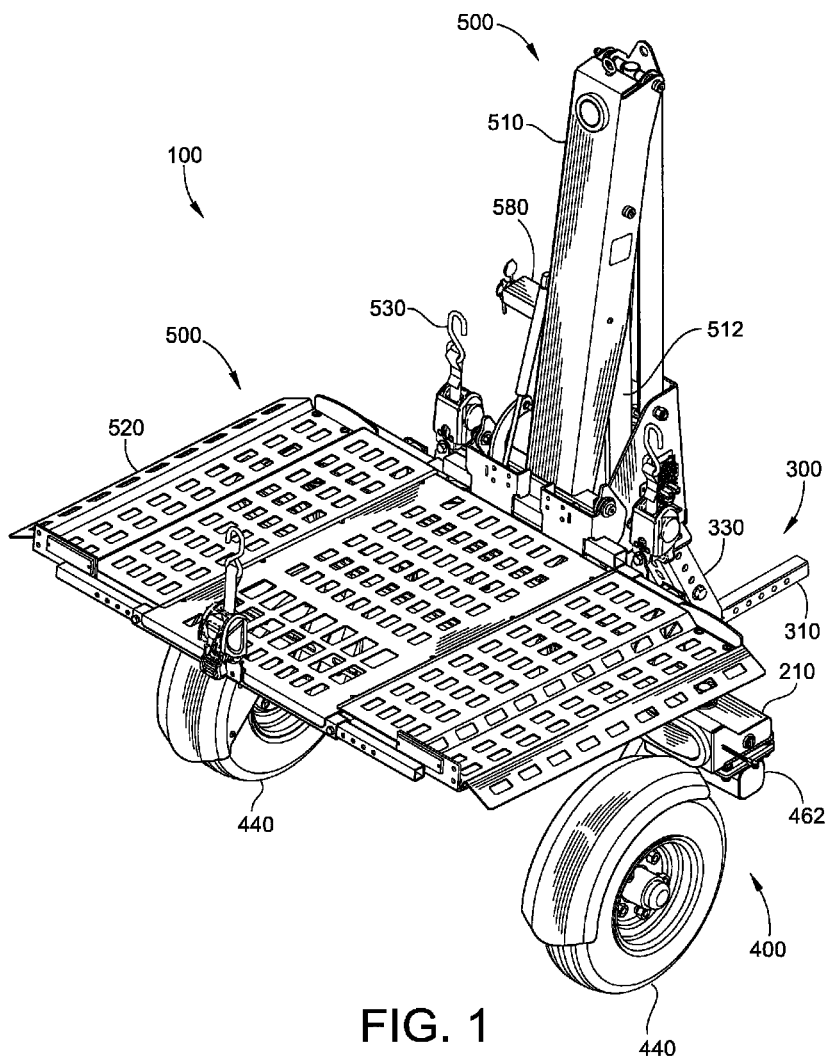
FIG. 1 is a perspective view of a platform lift trailer according to one or more embodiments of the present invention.
Figure 2:
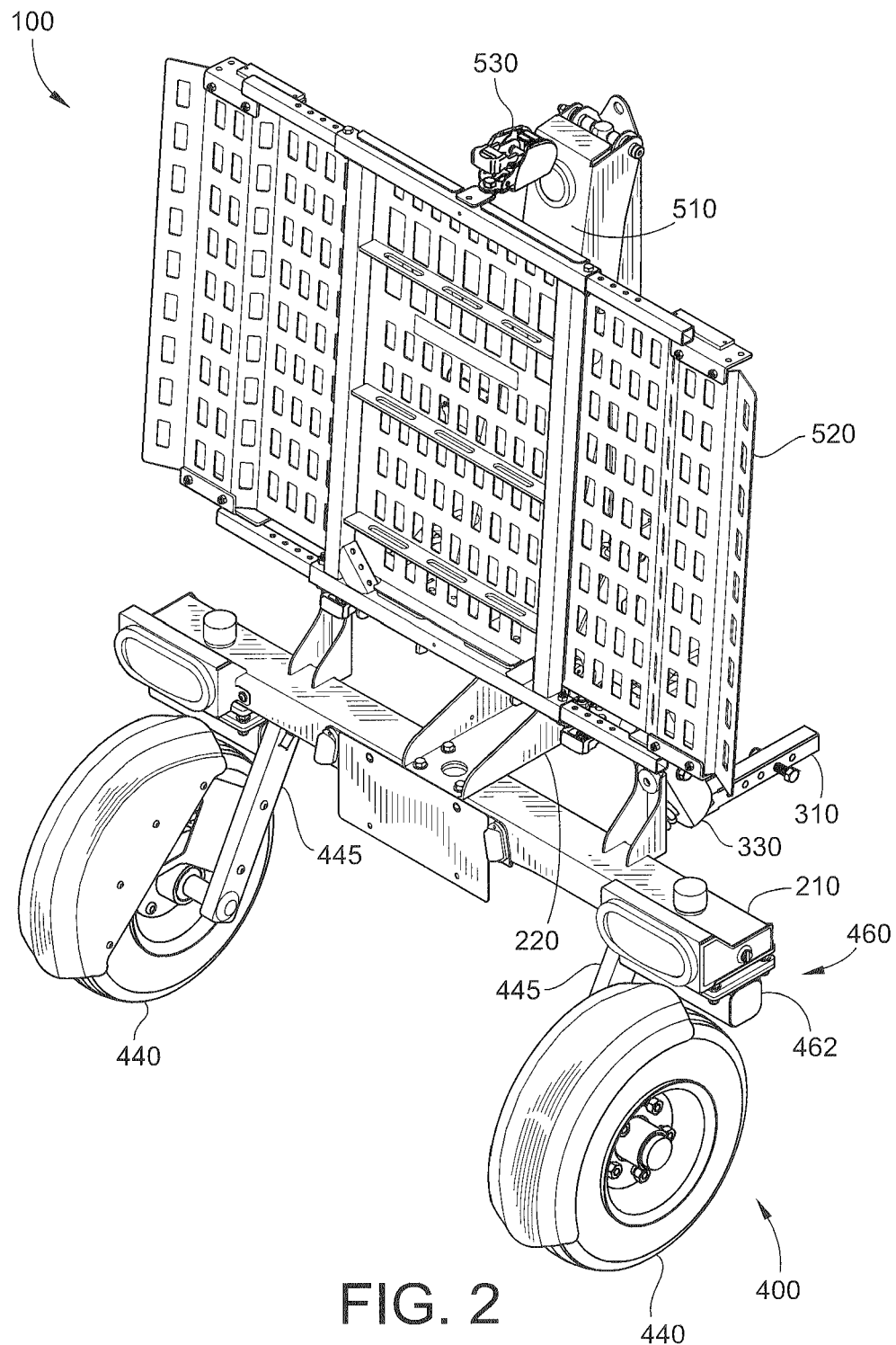
FIG. 2 is a perspective view of a platform lift trailer with a platform in its folded position.
Figure 3:
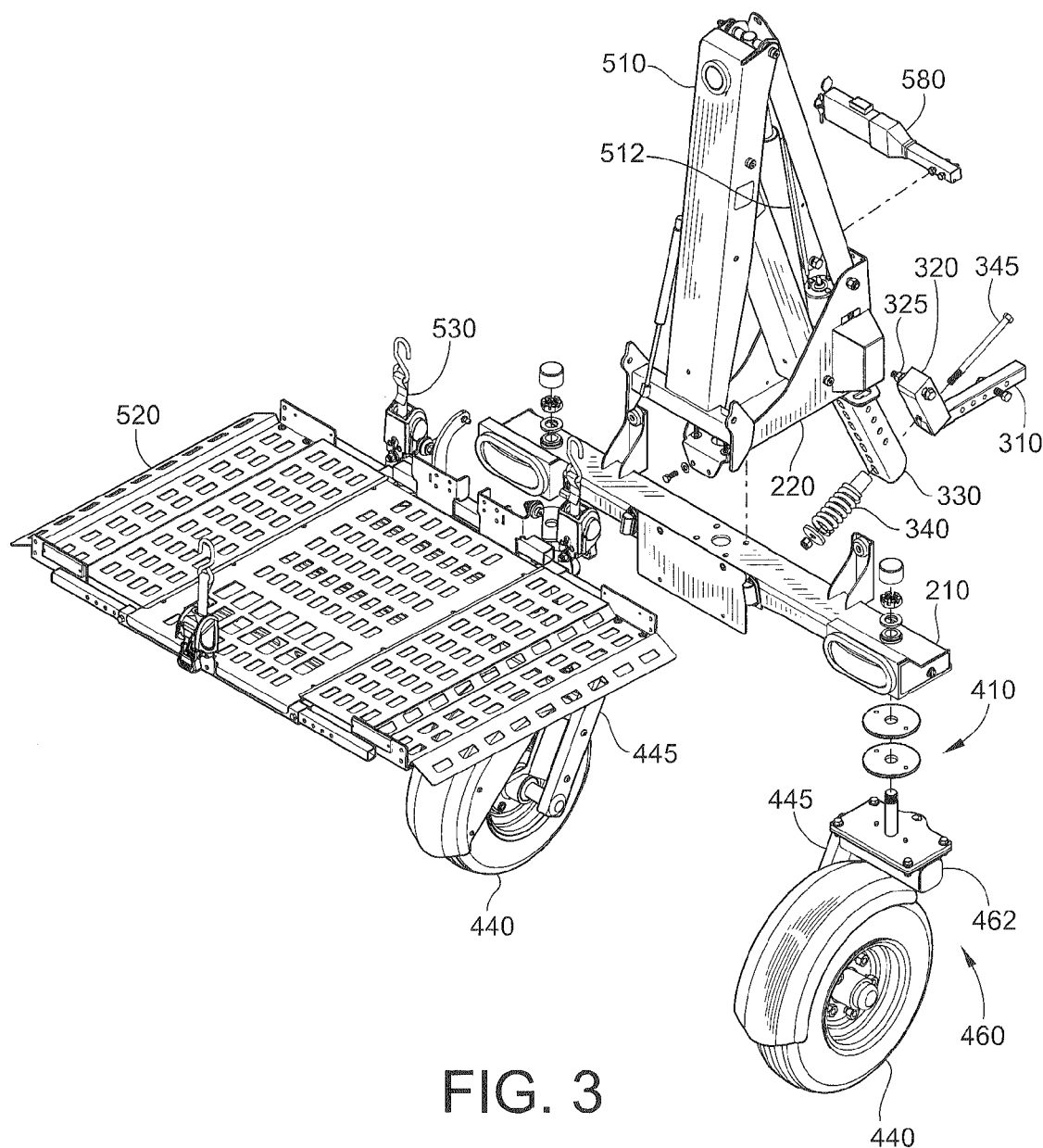
FIG. 3 is an exploded view of a platform lift trailer.
Figure 4:
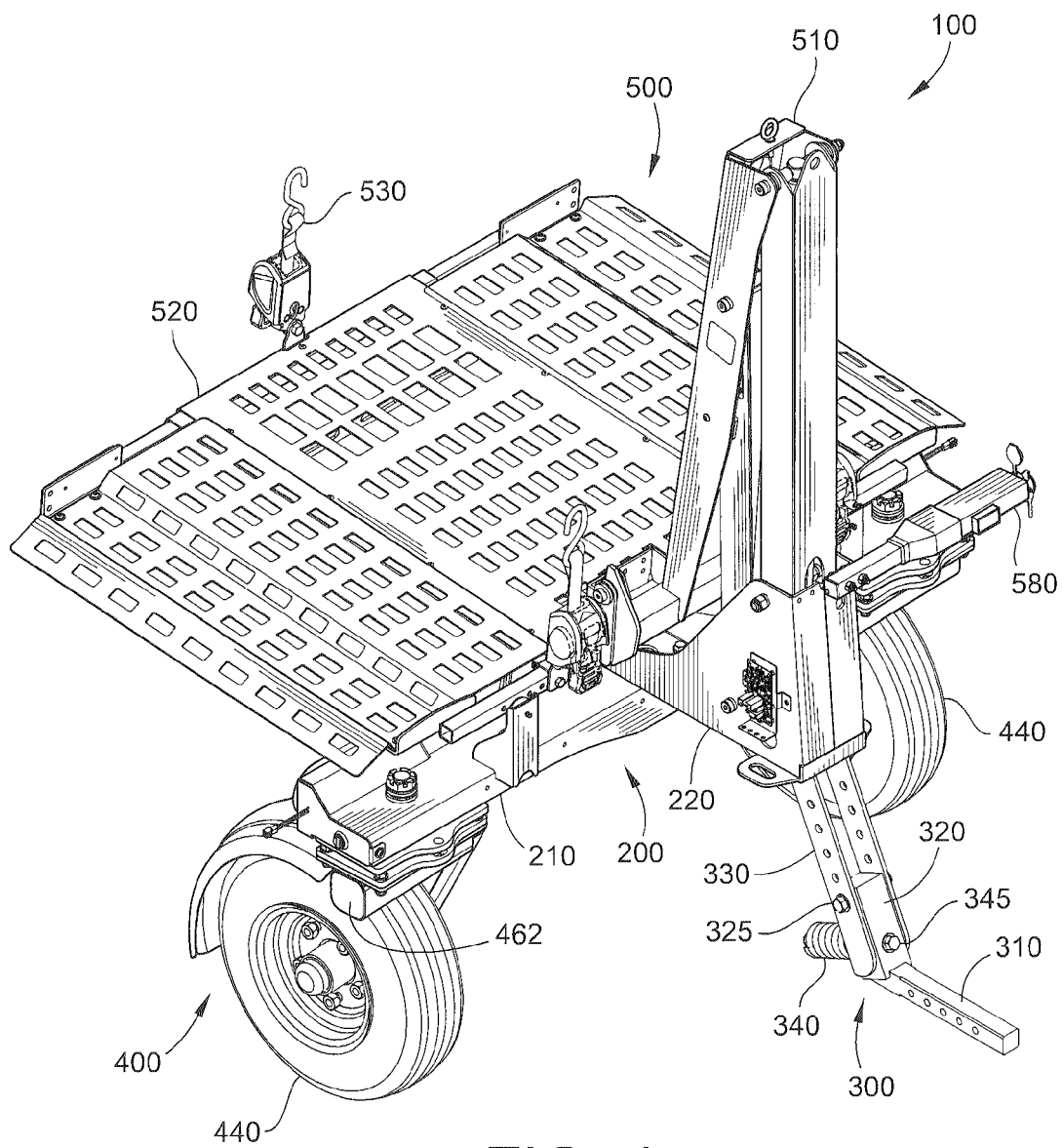
FIG. 4 is a perspective view of a platform lift trailer.
Figure 5:
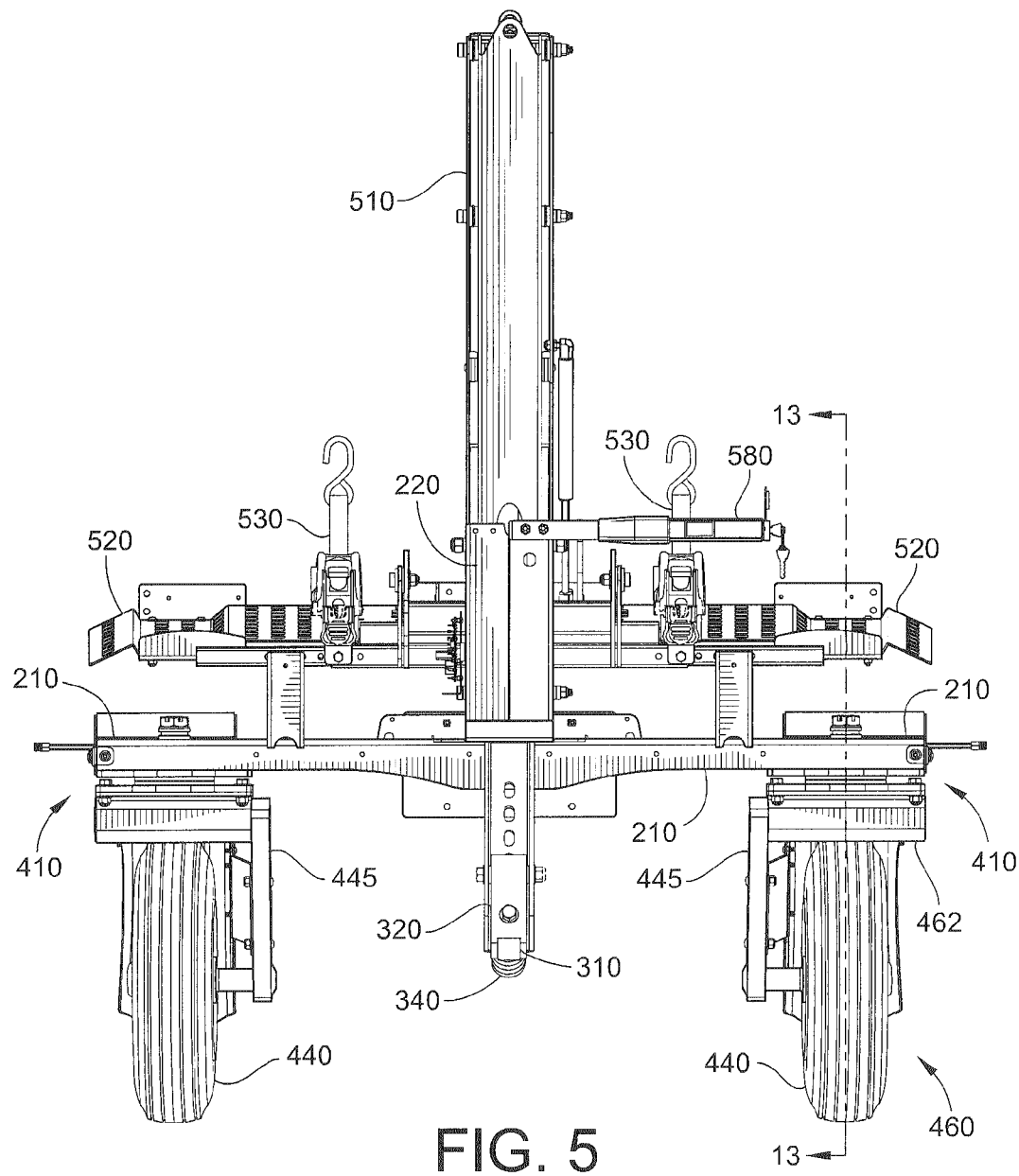
FIG. 5 is a front elevation view of a platform lift trailer.
Figure 6:
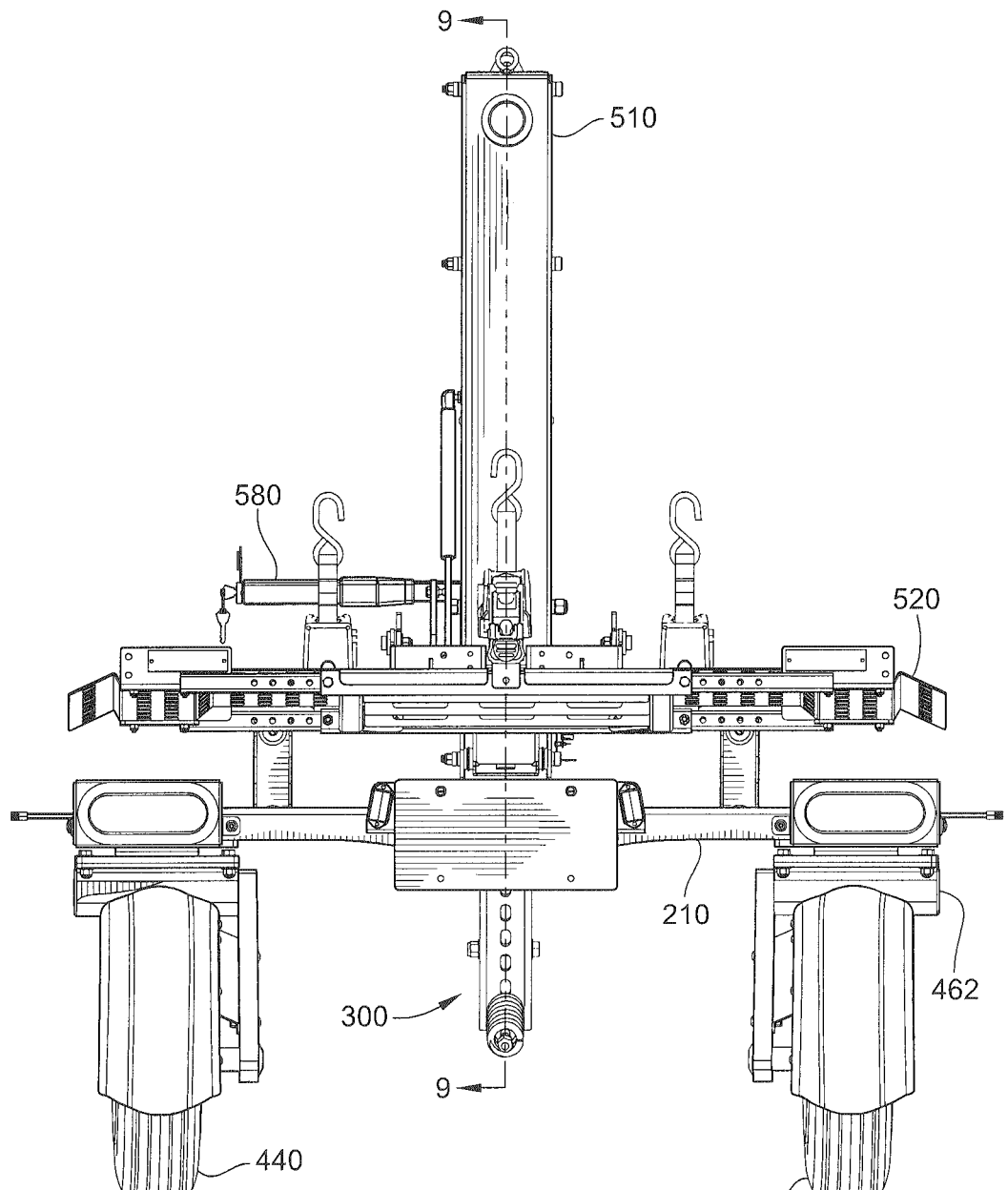
FIG. 6 is a rear elevation view of a platform lift trailer.
Figure 7:
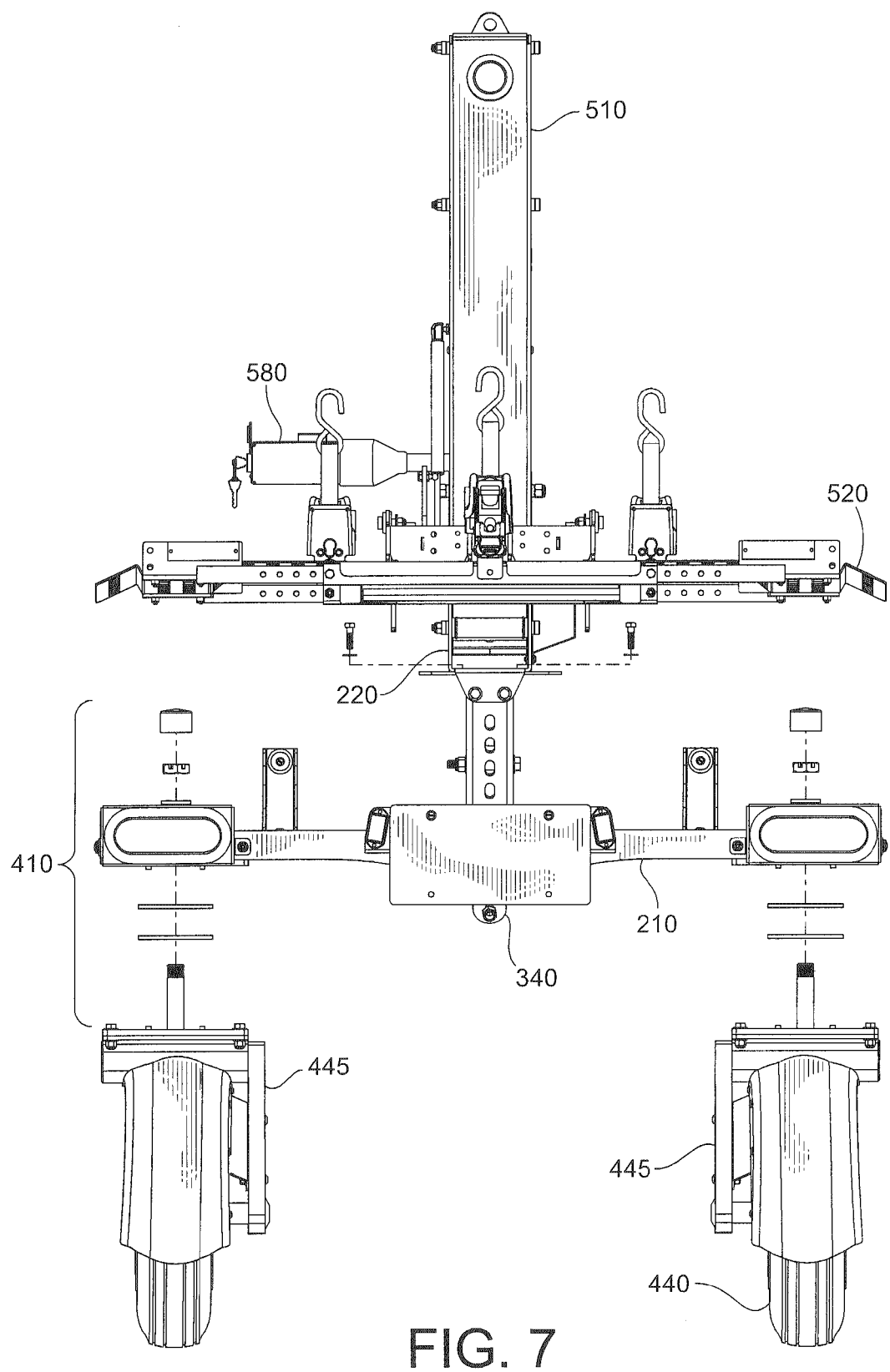
FIG. 7 is an exploded rear elevation view of a platform lift trailer.
Figure 8:
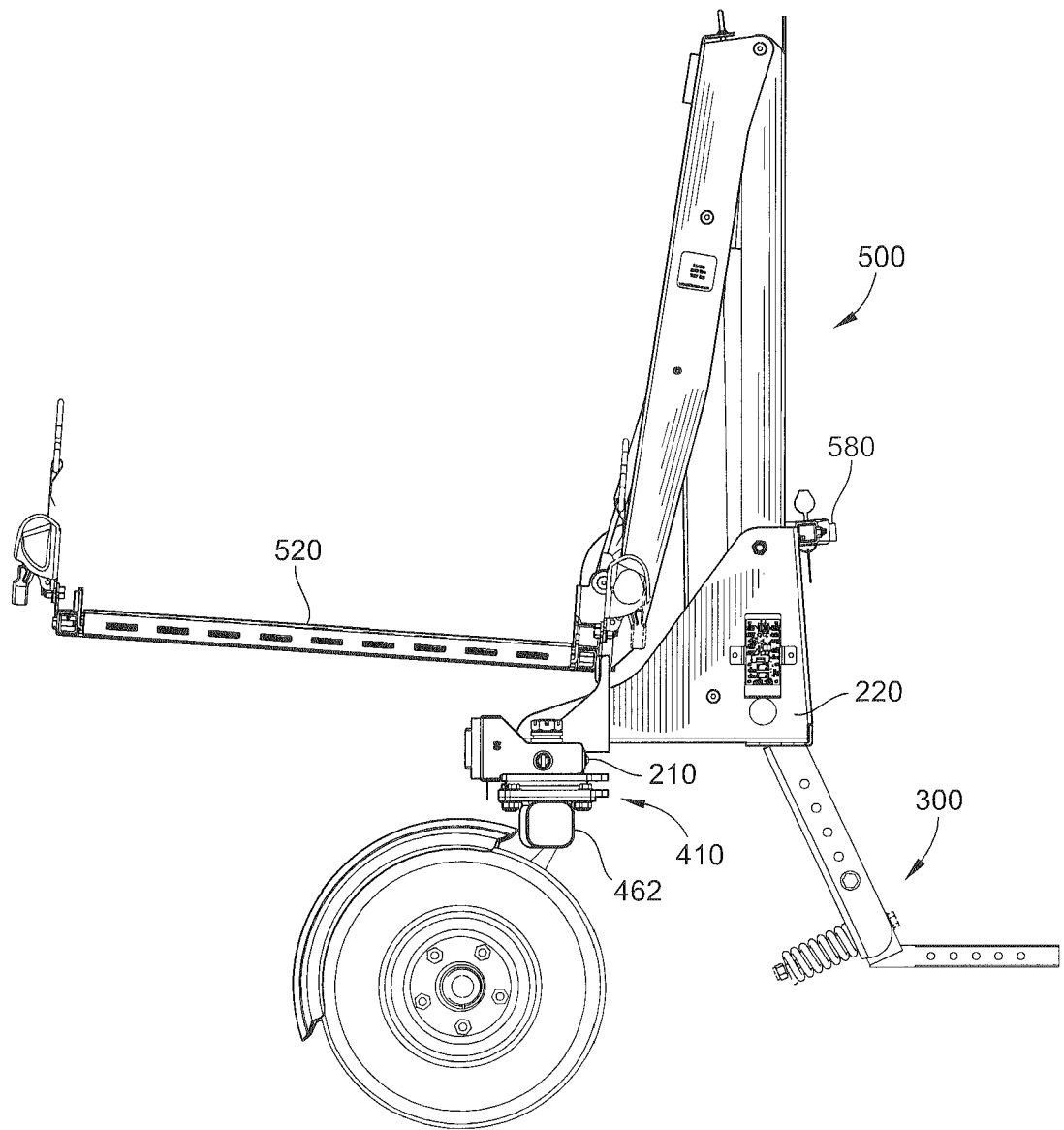
FIG. 8 is a side elevation view of a platform lift trailer.
Figure 9:
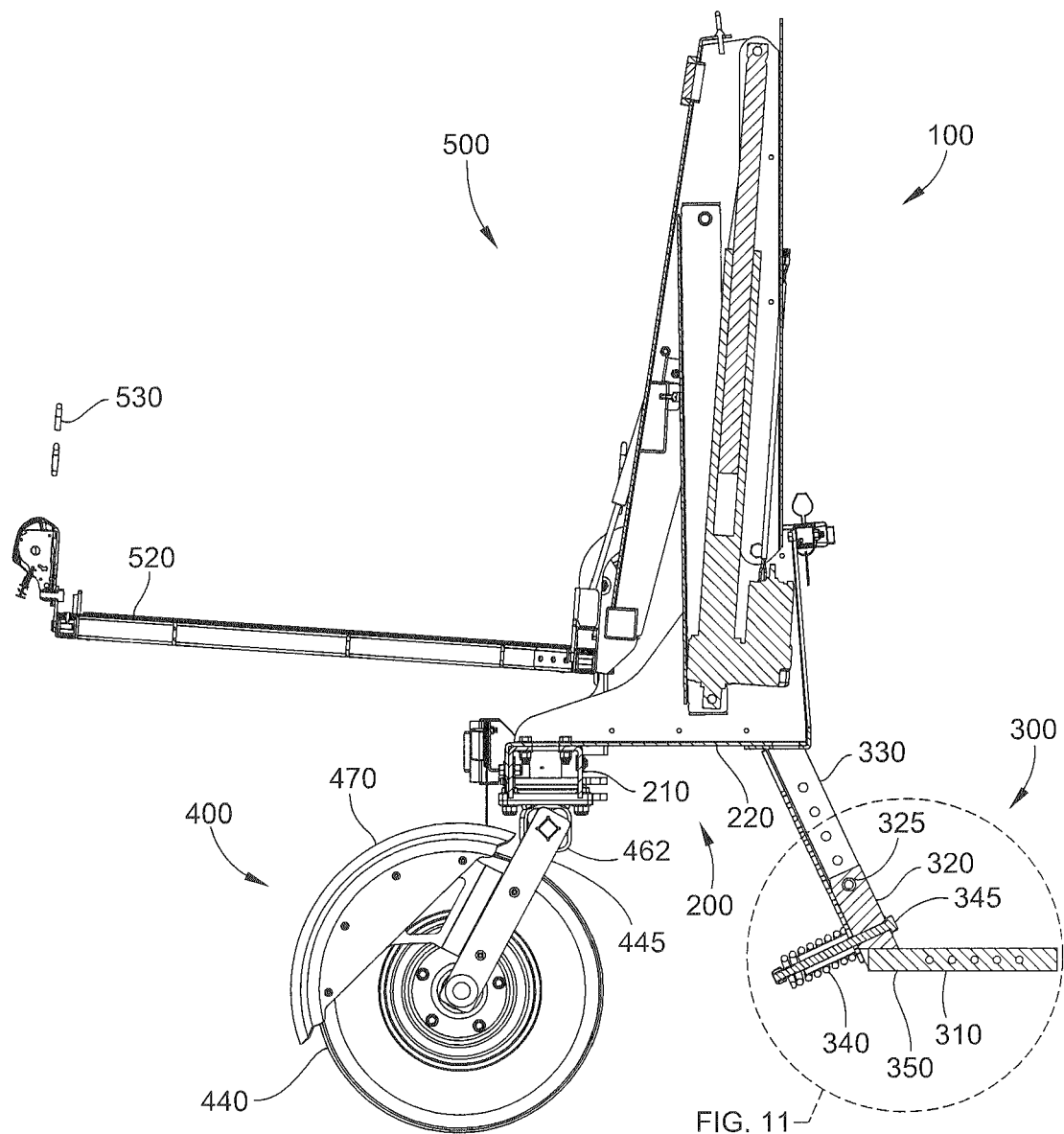
FIG. 9 is a side cross-sectional view of a platform lift trailer along the line 9-9 of FIG. 6.
Figure 10:
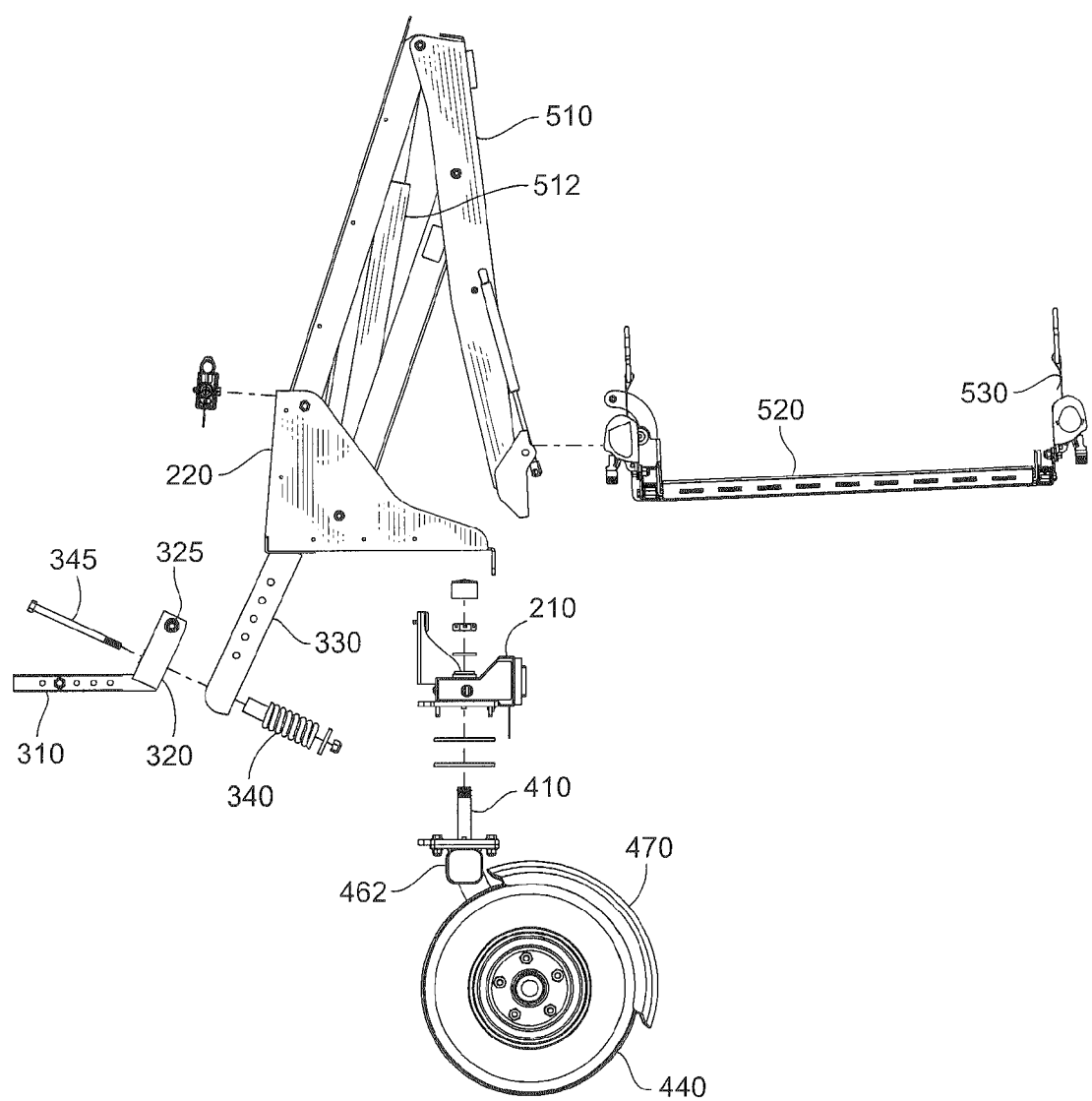
FIG. 10 is a side exploded rear elevation view of a platform lift trailer.

The following detailed description of the invention, including the Figures, will refer to one or more invention embodiments, but is not limited to such embodiments. Rather, the detailed description is intended only to be illustrative. Those skilled in the art will readily appreciate that the detailed description given with respect to the Figures is provided for explanatory purposes as the invention extends beyond such specific embodiments. Embodiments of the invention provide towable platform lift trailer apparatus, systems, methods, techniques and the like (and/or coupling systems and the like therefor) including (but not limited to) caster-supported lift devices that make loading, storing, transporting and unloading mobility devices and the like practical in connection with motor vehicles, including smaller motor vehicles. For example, in connection with a motor vehicle that cannot support the weight, strain, etc. of a directly-vehicle-supported, externally-mounted mobility device lift (e.g., a lift directly mounted to a trailer hitch or the like on and supported solely by the motor vehicle), a ground-engaging lift trailer according to one or more embodiments of the present invention can make an external lift practical. Moreover, other embodiments of the invention include a trailer coupler that employs a biasing means to isolate torsional forces that are applied between a motor vehicle and a trailer coupled thereto when the angular relationship of the trailer and motor vehicle change (e.g., when backing out of an inclined driveway, encountering a road bump, etc.). The biasing means applies a reduced torque-limiting force and prevents the torsional forces from damaging the trailer and/or motor vehicle. Other settings and uses will be apparent to those skilled in the art after considering the following disclosure and the Figures provided herewith.

Reference in the specification to "some embodiments," "one embodiment," "an embodiment," "various embodiments," of the present invention and similar phrases and terms means that a particular feature, structure or characteristic described in connection with such embodiment(s) is included in at least one embodiment of the present invention. Thus, appearances of such phrases in various places throughout the specification are not necessarily all referring to the same or any specific limiting embodiment.

Some examples of the present invention will be shown and explained in connection with a platform lift trailer using a four bar linkage and other external mobility device lifts, such as those made and sold by Bruno Independent Living Aids, Inc. of Oconomowoc, Wis. Each such embodiment can be (and in some embodiments is) mounted to a motor vehicle having a conventional receiver hitch socket or other motor vehicle trailer-mounting apparatus. A variety of other mobility device lifts can be used from any of a number of manufacturers. No conventional "trailer bed" (i.e., a conventional supporting planar member) is required in many embodiments, thus reducing the size of the platform lift trailer when compared to many conventional trailer configurations.

In the platform lift trailer 100 of FIGS. 1-10, mounting and support structure is provided by a chassis weldment 200 that includes a support beam 210 that extends in a transverse, generally lateral orientation. A lift assembly 500 is mounted atop chassis 200 and one or more caster assemblies 400 are mounted to the underside of chassis 200 to provide support from the ground or any other support surface that each caster assembly 400 engages. A coupler assembly 300 couples platform lift trailer 100 to a motor vehicle via a conventional trailer hitch, socket or the like, so that the platform lift 500 becomes a towable platform lift.

Figure 11:
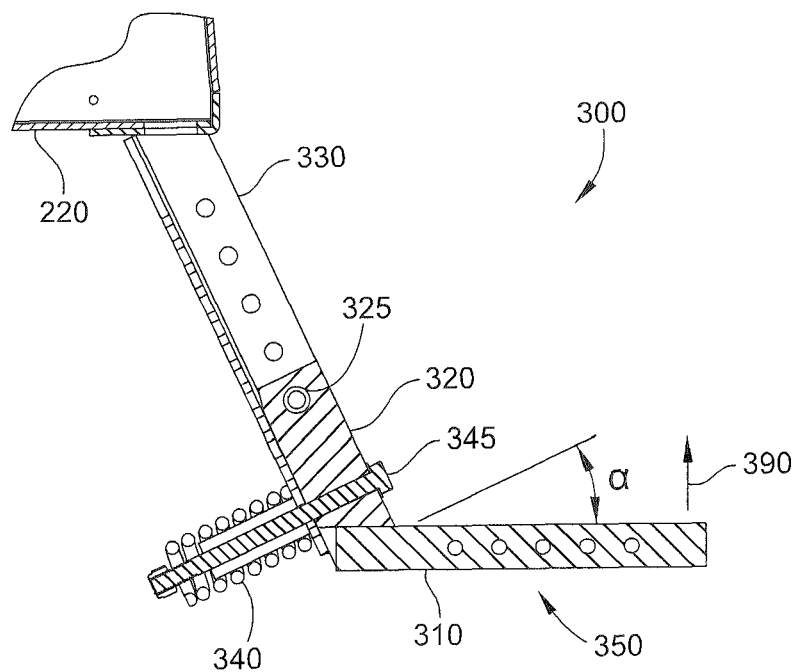
FIG. 11 is a cross-sectional view of a trailer coupling apparatus according to one or more embodiments of the present invention, detail from FIG. 9.

One embodiment of a coupler 300, shown in detail in FIG. 11, is a torque-limiting coupling means 300 and includes a motor vehicle hitch bar connector 310 that can be made of steel bar stock or the like. Holes are provided in connector 310 to permit longitudinal adjustment of the connector relative to a motor vehicle socket or other connecting apparatus. A pivot block 320 is welded to connector 310 and also can be made of steel bar stock. Block 320 and connector 310 together function as a lever 350 that is pivotably coupled to coupler channel 330 using a pivot bolt 325. Channel 330 is rigidly mounted to chassis 200 using appropriate means (e.g., bolting, welding, and/or the like). Biasing means are used to urge lever 350 into a first static position of coaxial alignment with channel 330. In some embodiments, the biasing means is a compression spring 340 adjacent to and bolted through channel 330 and lever 320 using spring bolt 345 to bias lever 320 into generally coaxial alignment with channel 330. Other biasing means can be used such as a tension spring, a torsion spring, a torsion member, a gas spring, a stack of Belleville springs, elastomeric apparatus, elastic bands/straps, and the like, as will be appreciated by those skilled in the art. Also, the biased lever structure of the coupler 300 can be adjusted in various ways. For example the pivot axis and biasing means can be located at the juncture of the channel 330 and chassis 200 (e.g., lift bracket 220). Other equivalent structures to the torque-limiting coupling means 300 will be apparent to those skilled in the art.

The following discussions of torsional forces between embodiments of a motor vehicle and a platform lift trailer or other trailer coupled thereto will refer to "vertical angular displacement" between the motor vehicle and trailer. For consistency in describing such displacement, the trailer can be assumed to maintain a generally horizontal position while the motor vehicle's angular position changes relative to the generally horizontal trailer orientation. Therefore, when a motor vehicle and coupled trailer traveling forward encounter a ramp, inclined driveway or other inclined path, it is assumed that the it is the motor vehicle that changes position, thus generating a counterclockwise torsional force on connector 310, as shown by arrow 390 in FIG. 11. As will be appreciated by those skilled in the art, this assignment of terminology can also be used to describe equivalently a situation in which the trailer moves "upward" relative to the motor vehicle, for example when the motor vehicle and trailer are backing up and reach the bottom of a ramp or inclined driveway.

When such a counterclockwise torsional force is applied to connector 310, as indicated by arrow 390 in FIG. 11, biased lever 350 resists rotation out of channel 330 due to the force exerted by biasing means 340. When the biasing force of spring 340 is overcome, the pivoting of lever 350 defines a coupler displacement angle α upward from horizontal (this angle α can be limited by the length of spring bolt 345 to set a maximum angular displacement between the chassis and any coupler lever, and in other ways well known to those skilled in the art). Therefore, as the upward vertical angular displacement angle ct between a motor vehicle and platform lift trailer 100 increases, angle Gt increases and the resistance of spring 340 works to prevent the weight of the motor vehicle from being applied directly and fully to the device 100. Instead, only the resistance force of the biasing means 340 is applied. Using the configuration of the torque-limiting coupling means 300 shown in FIGS. 1-10, no "downward" vertical angular displacement is accommodated, though such accommodation is readily achievable using alternate embodiments of the coupler.

Figure 14:
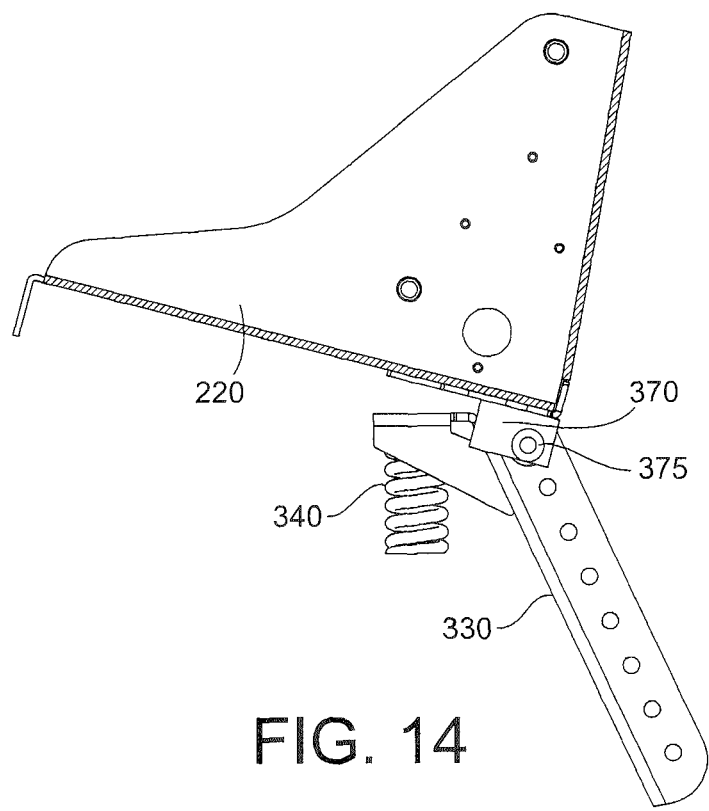
FIG. 14 is a side elevation view of a trailer coupling apparatus in an angularly displaced position according to one or more embodiments of the present invention.
Figure 15:
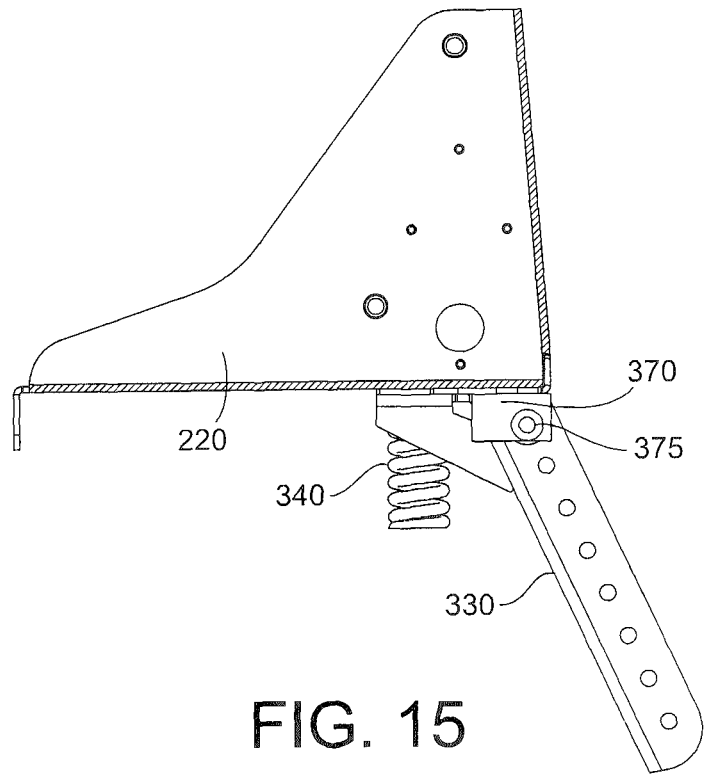
FIG. 15 is a side elevation view of a trailer coupling apparatus in a first static position according to one or more embodiments of the present invention.
Figure 16A:
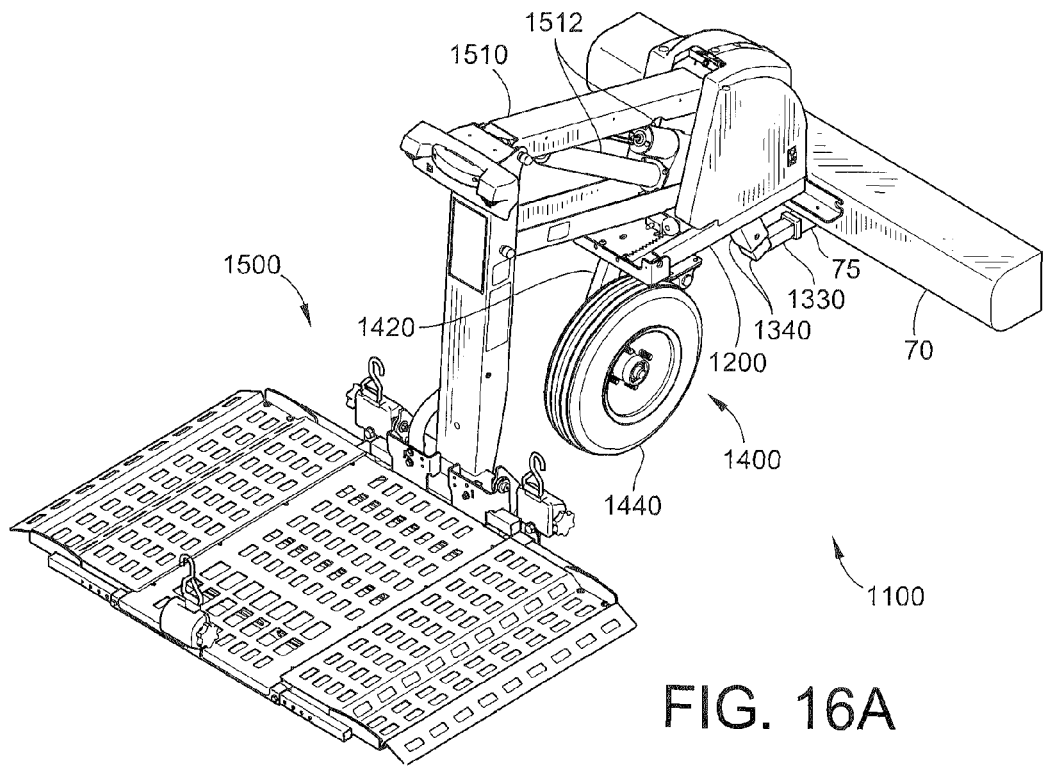
FIGS. 16A, 16B are perspective views of a platform lift trailer, wherein the lift platform is in a lowered position.
Figure 16B:
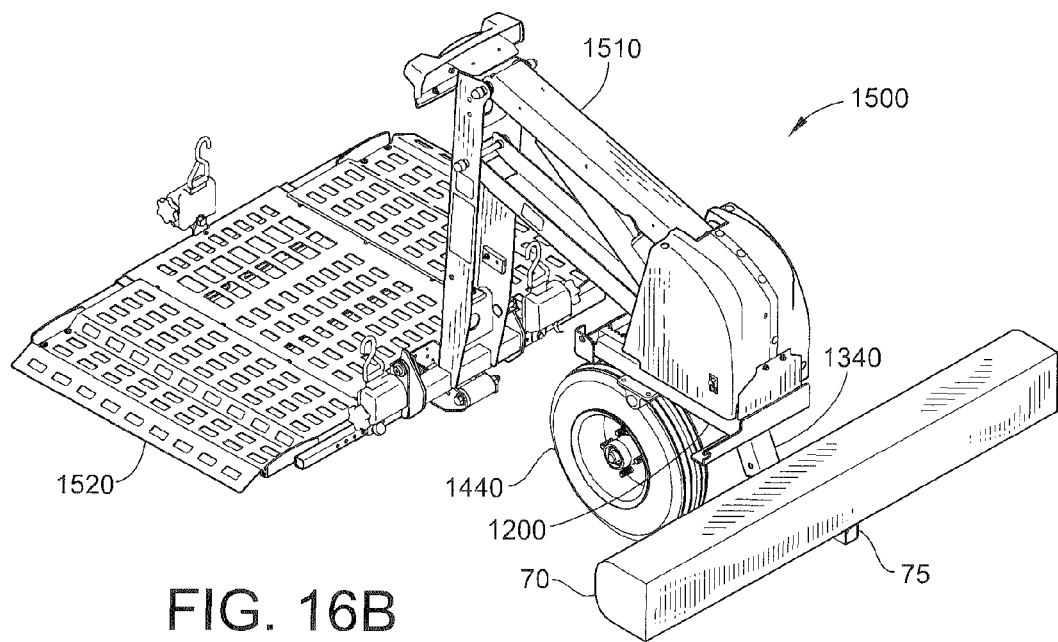
Figure 17:
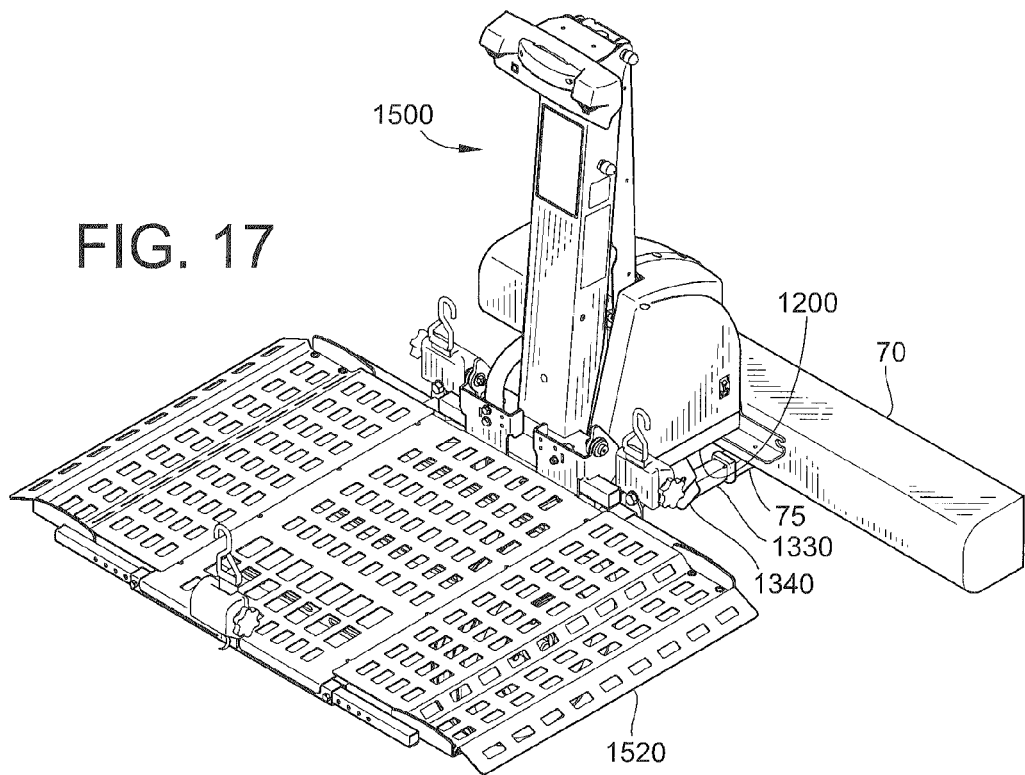
FIG. 17 is a perspective view of a platform lift trailer, wherein the lift platform is in a raised and open position.
Figure 18:
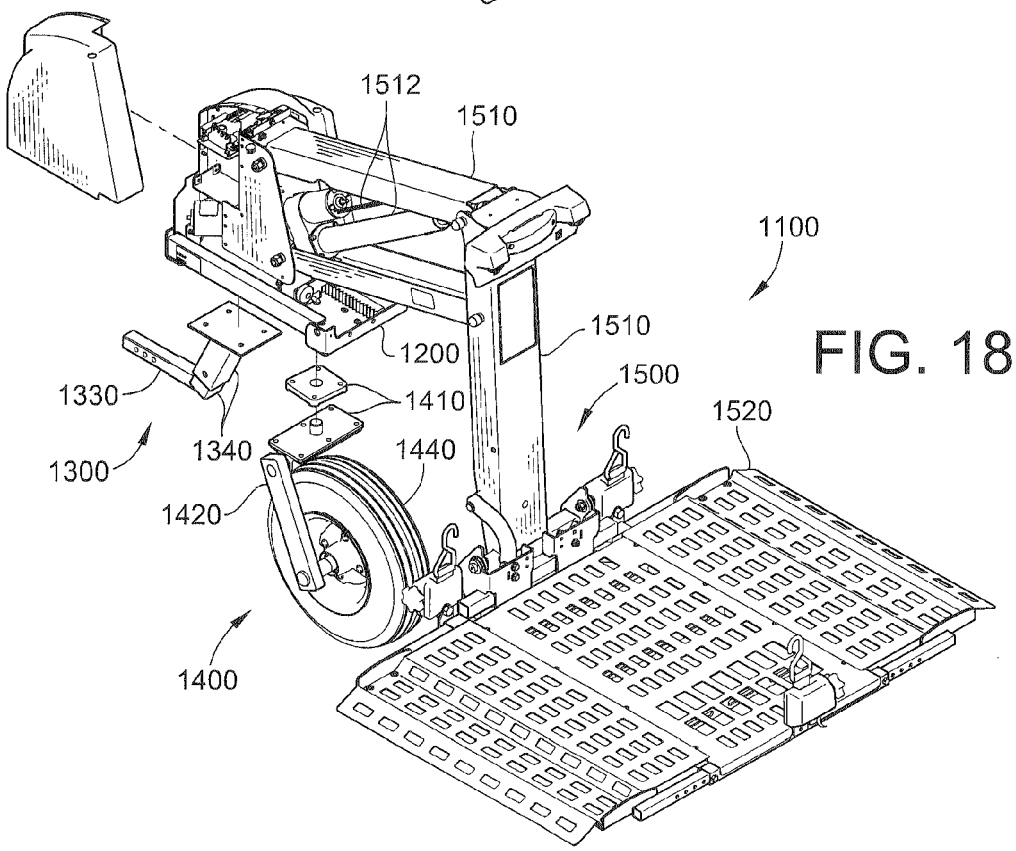
FIG. 18 is an exploded view of a platform lift trailer, wherein the lift platform is in a lowered position.
Figure 19:
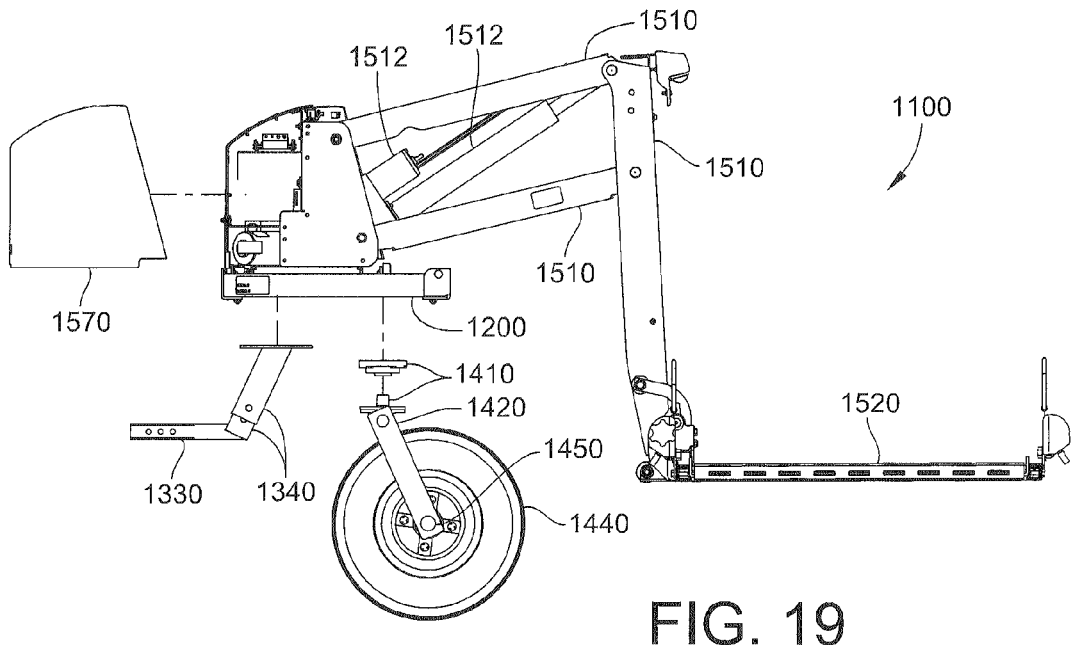
FIG. 19 is a side elevation, partially exploded view of a platform lift trailer, wherein the lift platform is in a lowered position.
Figure 20:
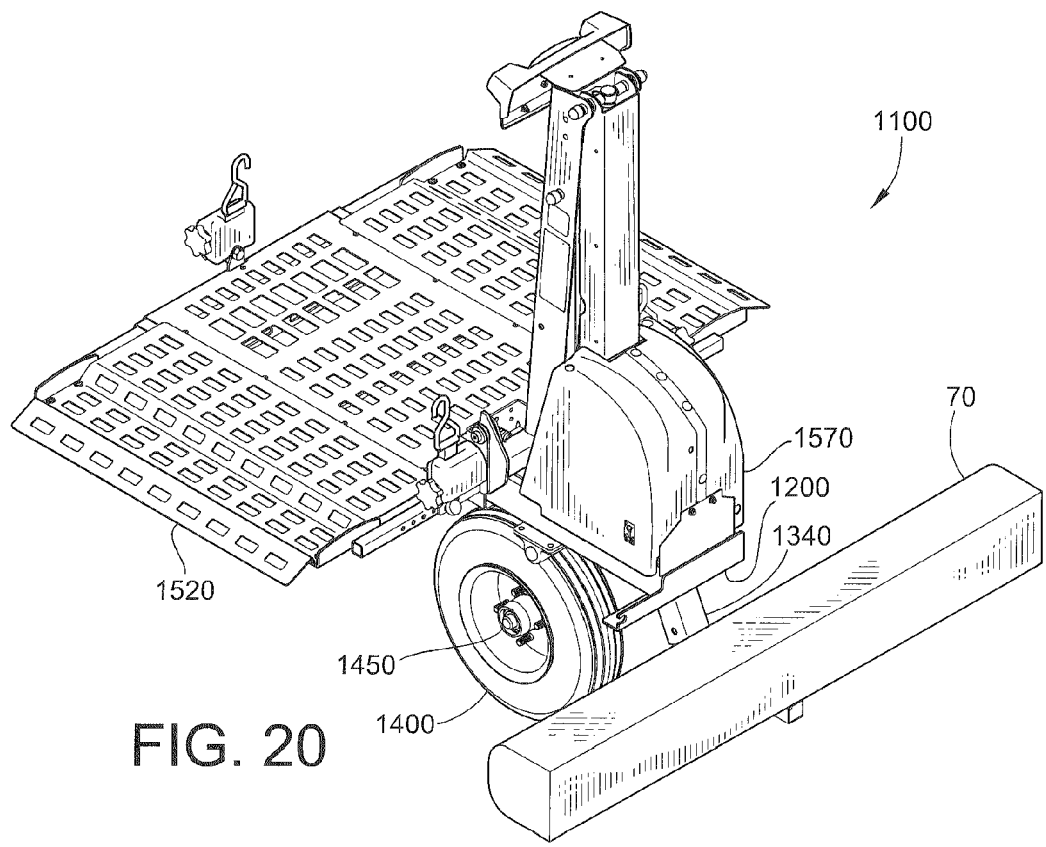
FIG. 20 is a perspective view of a platform lift trailer coupled to a motor vehicle, wherein the platform is in a raised and open platform position.
Figure 21:
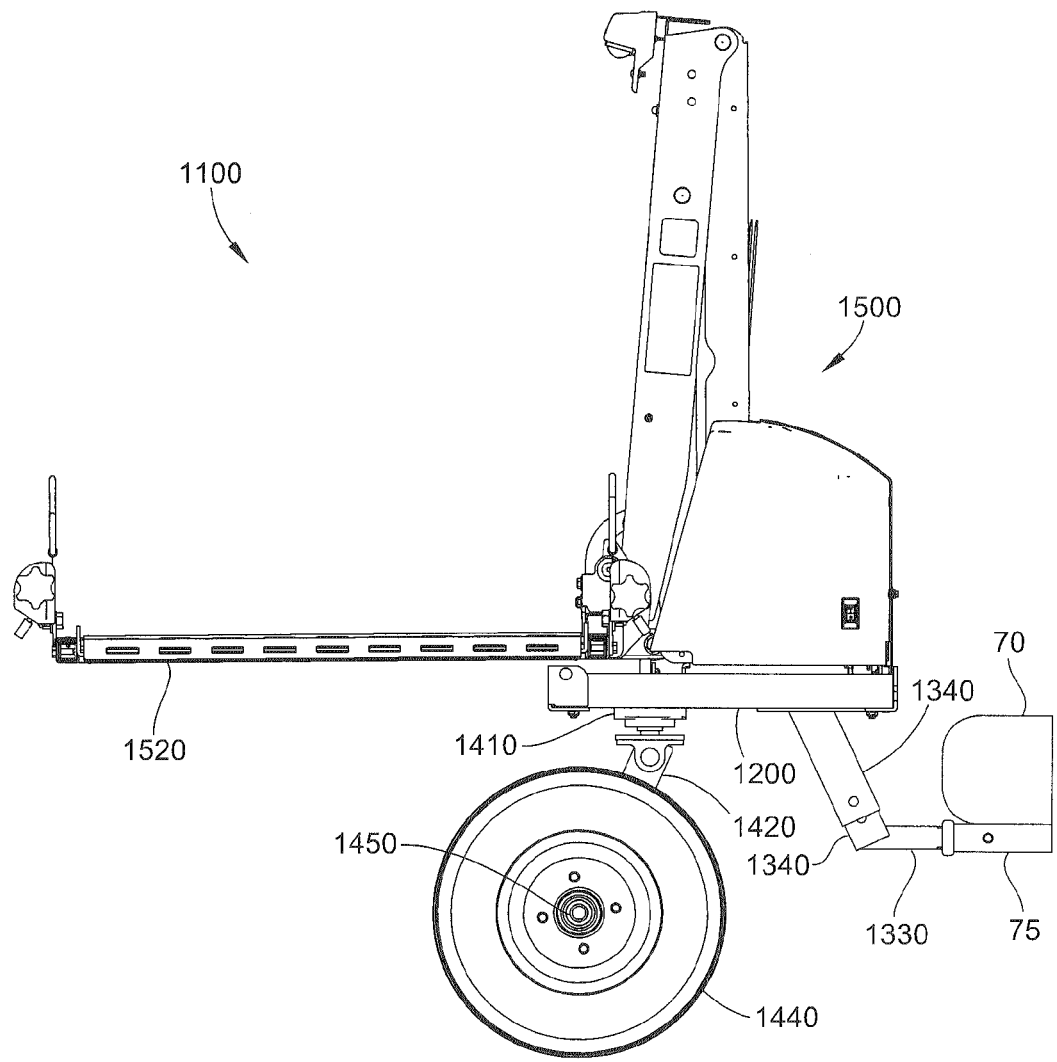
FIG. 21 is a side view of a platform lift trailer coupled to a motor vehicle, with the platform in its raised and open position.

Another embodiment of the motor vehicle coupling means is shown in FIGS. 14 and 15, wherein a bracket 370 is secured to lift mounting bracket 220. Lever bracket 330 is pivotably coupled to bracket 370 using a bolt 375 of other pivot. A biasing spring 340 is coupled to both the lift mounting bracket 220 and the lever bracket 330 to urge the lever bracket into the resting or static position shown in FIG. 15. When a counterclockwise torsional force is applied to lever bracket 330, for example by a motor vehicle to which lever bracket 330 is hitched, spring 340 limits the force applied to the trailer and/or the motor vehicle, but allows pivoting of the lever bracket 330 into an angularly displaced position, as seen in FIG. 14.

As noted above, the lift-supporting and ground-engaging wheel apparatus can include one or more casters, etc. Each of the two caster assemblies 400 shown in FIGS. 1-10 includes a caster tire 440, which also can be another type of wheel or comparable apparatus, including a highway-suitable tire. As can be seen from the Figures, each tire 440 is able to swivel fully using a swivel mounting apparatus 410. Splash guards 470 protect cargo loaded on the lift device 100 from water, road debris, road salt, etc. Each caster assembly 400 also has a caster suspension apparatus 460. In platform lift trailer 100 shown in FIGS. 1-10, caster suspension apparatus 460 is the same or similar to the well-known apparatus shown in U.S. Pat. No. 3,208,168 issued to Henschen on 28 Sep. 1965 and/or U.S. Pat. No. 3,436,069 issued to Henschen on 1 Apr. 1969. Henschen describes "an elastic torsion joint" having "concentrically arranged inner and outer tubular members of a polygonal cross-section." The inner member is spaced from the outer member by a plurality of elongated cushioning rollers disposed between an external surface of the inner member and a pair of intersecting internal surfaces of the outer tubular member. This configuration yieldingly resists relative rotation of the inner and outer members about a generally common axis. A load supporting arm is connected to one end of the inner member and can be a caster mounting bracket 445.

Figure 12:
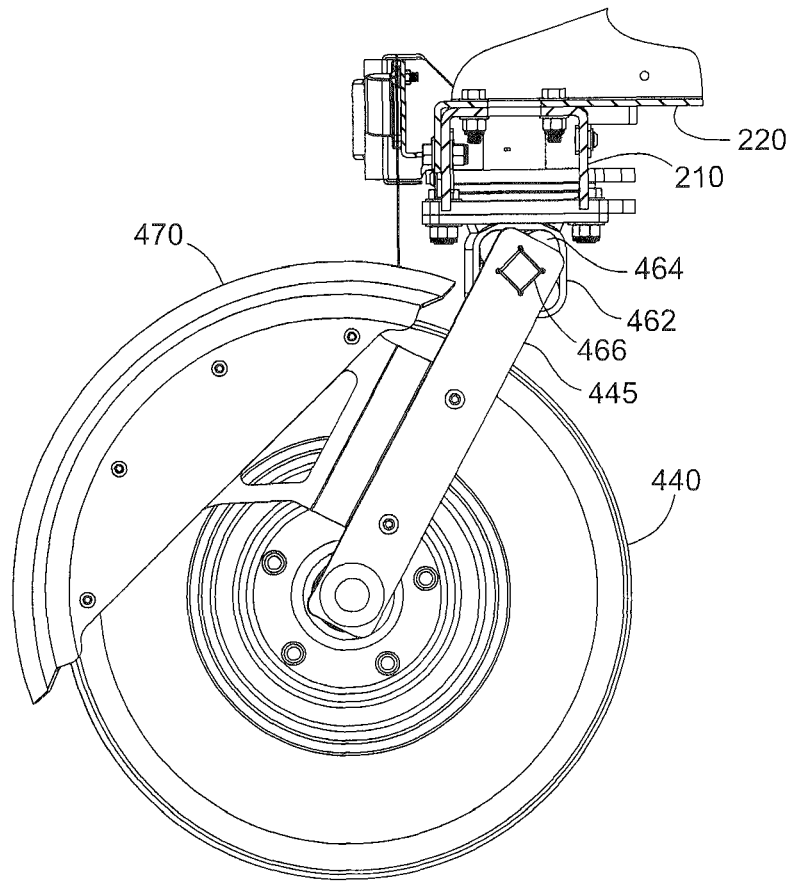
FIG. 12 is a detailed side view of a platform lift trailer caster assembly according to one or more embodiments of the present invention.
Figure 13:
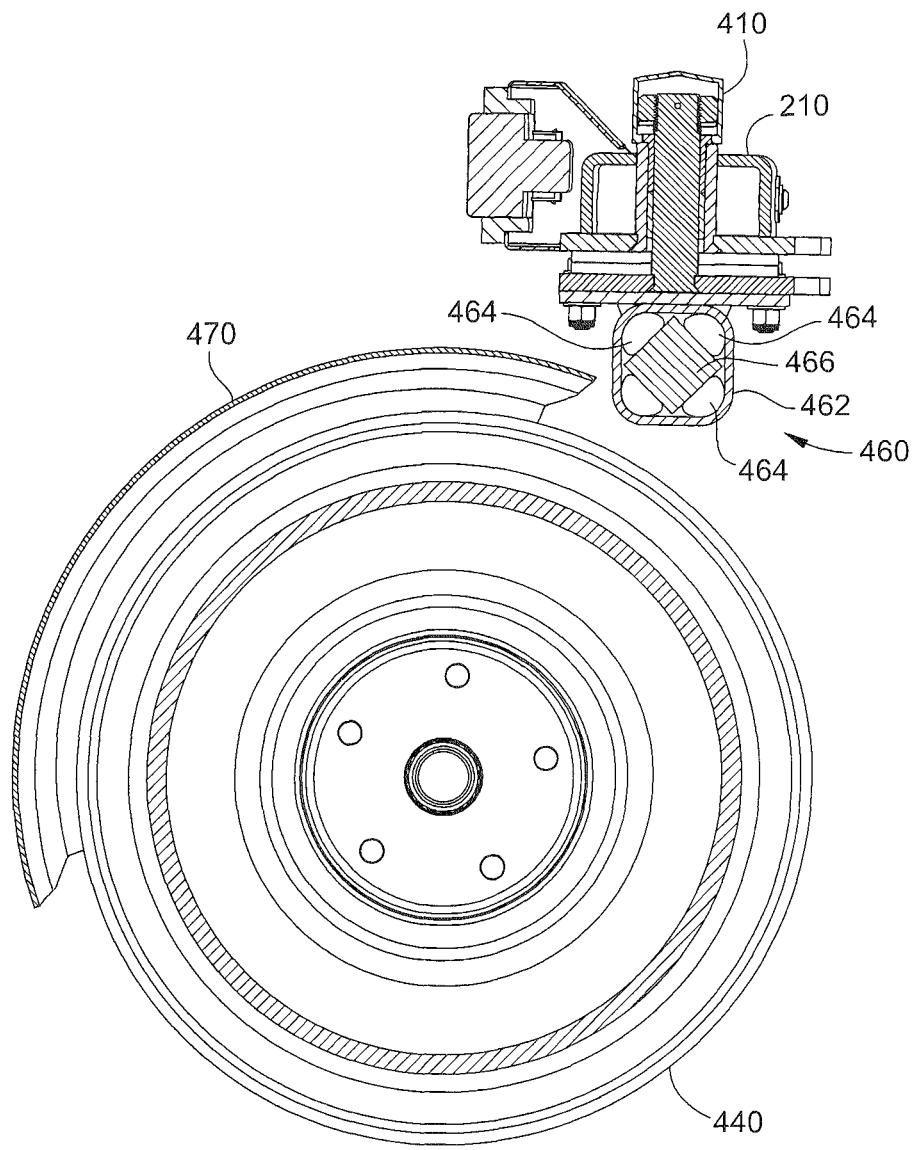
FIG. 13 is a cross-sectional side view of a platform lift trailer caster assembly according to one or more embodiments of the present invention along the line 13-13 of FIG. 5.

As seen in FIGS. 12 and 13, suspension apparatus 460 includes tubular housing 462 containing a number of cushioning elements 464 that can be made of elastomeric material or the like and act as cushions, cushioning rods or the like. Torsion shaft 466 fits within housing 462 and elements 464 so that elements 464 resist torsional forces applied by shaft 466 as it rotates when tire mounting bracket 445 rotates shaft 466 (e.g., when tire 440 hits a road bump). Suspension apparatus 460 for each caster tire 440 can be bolted to the swivel apparatus 410 that extends through beam 210. In some embodiments, suspension apparatus 460 cooperates with the torque-limiting coupling means 300 discussed above to further reduce the risk of damage to trailer 100 or a motor vehicle when there is upward vertical angular displacement between trailer 100 and a motor vehicle to which the trailer 100 is coupled (e.g., when backing out of a driveway, parking lot, inclined parking space, or the like). In other embodiments a trailer can include (instead of or in addition to the suspension described above) wheel or caster suspension means such as a conventional motor vehicle shock absorber, a coil over shock absorber apparatus, a gas spring, and/or an elastomeric member. As will be appreciated by those skilled in the art, the caster suspension and force-limiting coupler are configured to and work in combination to reduce the risk of damage to or undesirable behavior by the trailer and/or a motor vehicle.

Chassis 200 also includes a lift mounting bracket 220 in embodiments of trailer 100 shown in FIGS. 1-10. A lift 500 is mounted to bracket 220 using bolts and/or other appropriate lift mounting means. In FIGS. 1-10, lift 500 uses a four bar linkage system and can be used to load, store, transport and unload personal mobility devices. With such four bar linkage lifts, a lift platform 520 moves in a generally continuous motion from its stored position to its fully deployed position (i.e., open and resting on the ground or other surface). The platform is fully raised and retracted when in its stored position, which includes platform 520 being in its "open" configuration (shown, e.g., in FIG. 1) and in its "folded" position (shown, e.g., in FIG. 2).

Other lift configurations are usable with embodiments of the platform lift trailer and include two-stage platform movement mechanisms that separately control horizontal movement and vertical movement to extend and retract the lift platform horizontally with a horizontal movement mechanism, and to raise and lower a platform vertically using a vertical movement mechanism. Variations and combinations of these operations also are found in various lifts (e.g., lifts using a four bar linkage combined with a horizontal slide mechanism to move the entire four bar linkage and platform horizontally during use). Control of a given lift's operation is governed by a control mechanism 580 or the like, which controls actuators and the like to move platform 580 as desired. Electrical and/or other power for operation of the platform lift trailer can come from a motor vehicle's battery or an auxiliary power source, as will be appreciated by those skilled in the art, and such power source(s) will be understood to be part of control mechanism 580 in the embodiments shown, described and claimed herein.

These lifts are particularly helpful in loading, storing, transporting and unloading personal mobility devices such as scooters, power chairs and other products used by physically challenged individuals. The four bar linkage lift 500 of FIGS. 1-10 uses link arms 510 controlled by one or more actuators 512 or the like. As will be appreciated by those skilled in the art, the coupling of trailer 100 to a motor vehicle means that lift 500 is supported by both each caster assembly 400 (i.e., by the ground or other support surface) and the motor vehicle itself. This configuration distributes the weight of the lift and any other equipment and/or components and provides a stable base for operating lift 500. Swiveling of tires 440 allows reasonable motion of trailer 100 when coupled to a motor vehicle moving in a forward or backward direction. When moving in reverse, the substantially rigid lateral connection between trailer 100 and a motor vehicle reduces jackknifing and/or other undesirable behavior, actions and problems. The torque-limiting coupling means used in some embodiments of a platform lift trailer and shown in the Figures also provides limited protection against damage when the trailer and a motor vehicle to which it is coupled encounter vertical angular displacements that increase angle α.

As will be appreciated by those skilled in the art, embodiments of the platform lift trailer are constructed using materials, components and in a manner that permits use of the platform lift trailer on roadways, highways, etc. at and in normal transportation speeds and conditions. Other apparatus can be used (e.g., tarps, covers, etc.) to further protect cargo on a platform lift trailer during storage and/or transportation.

Figure 22:
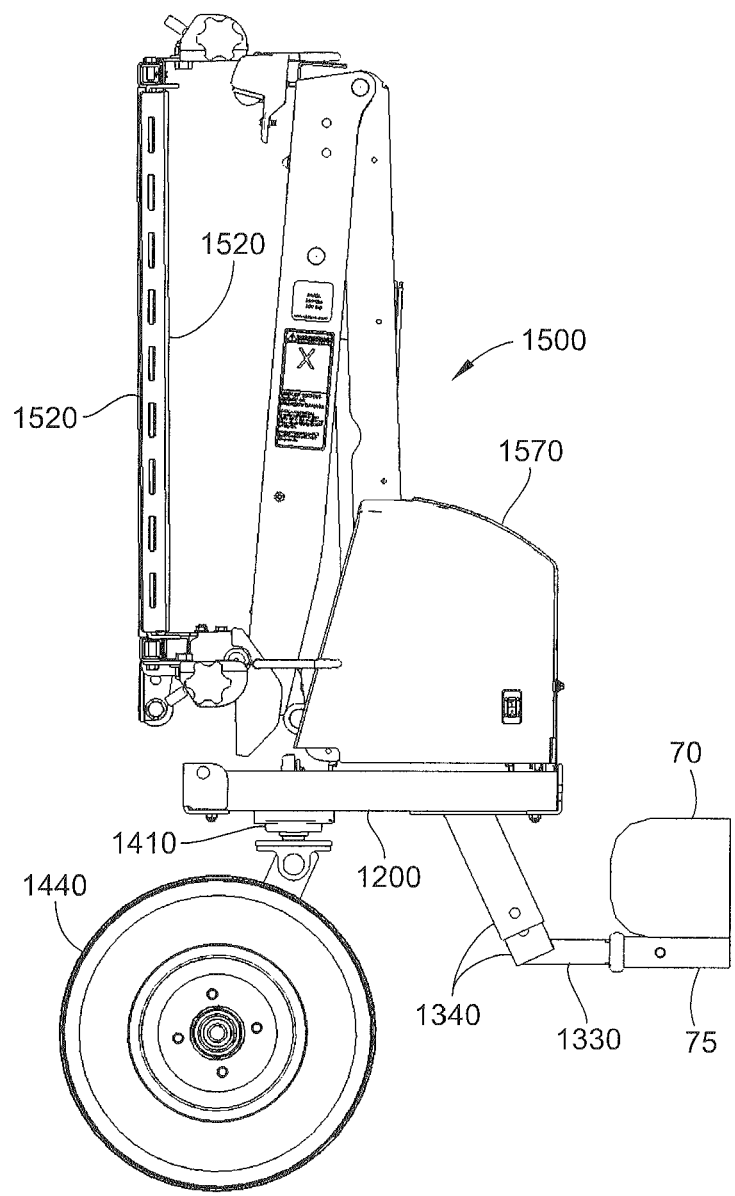
FIG. 22 is a side view of a platform lift trailer coupled to a motor vehicle, wherein the platform is folded.
Figure 23:
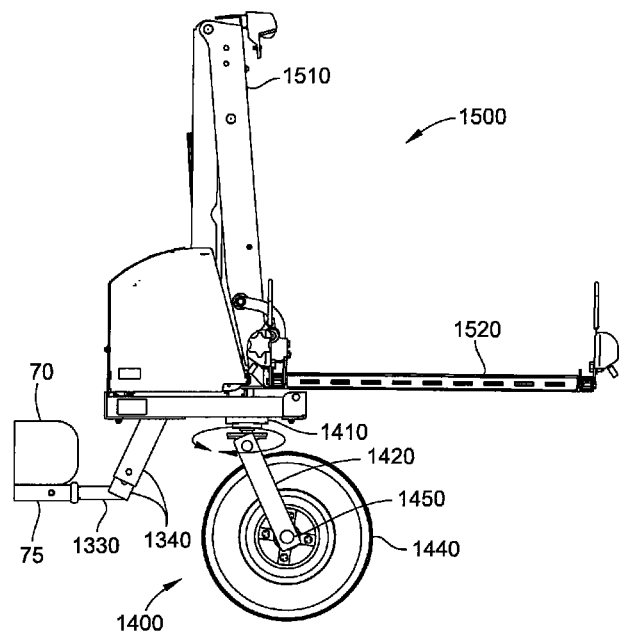
FIGS. 23, 34 are side views of a platform lift trailer coupled to a motor vehicle, wherein the platform is in a raised, open position, showing caster swiveling.
Figure 34:
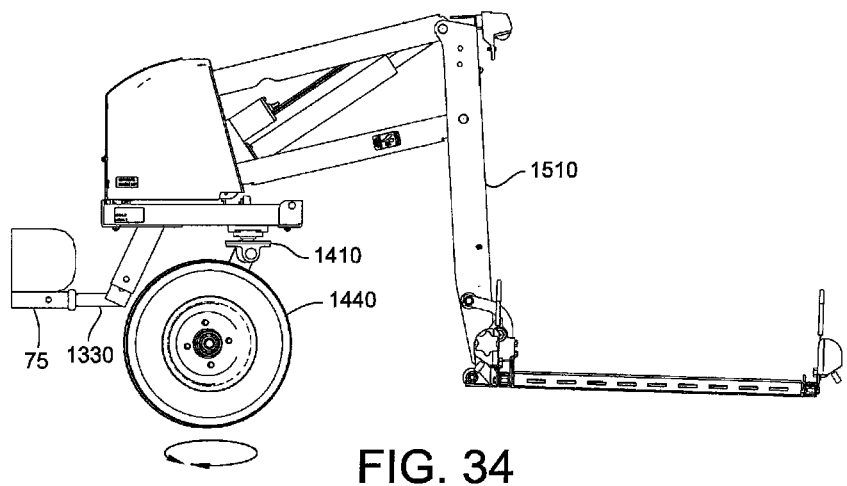
Figure 24:
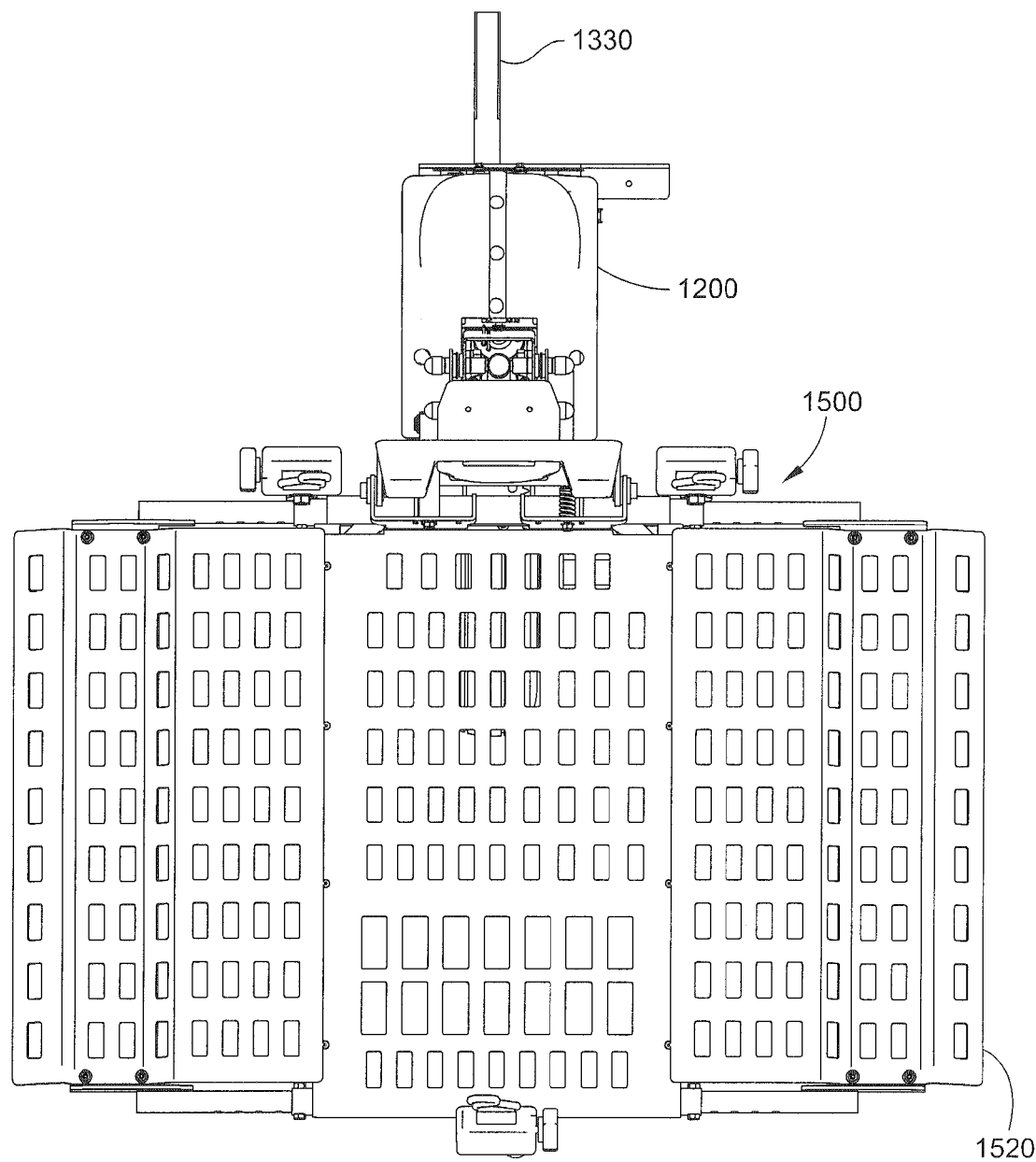
FIG. 24 is a top view of a platform lift trailer, with the platform in a raised and open position.
Figure 25:
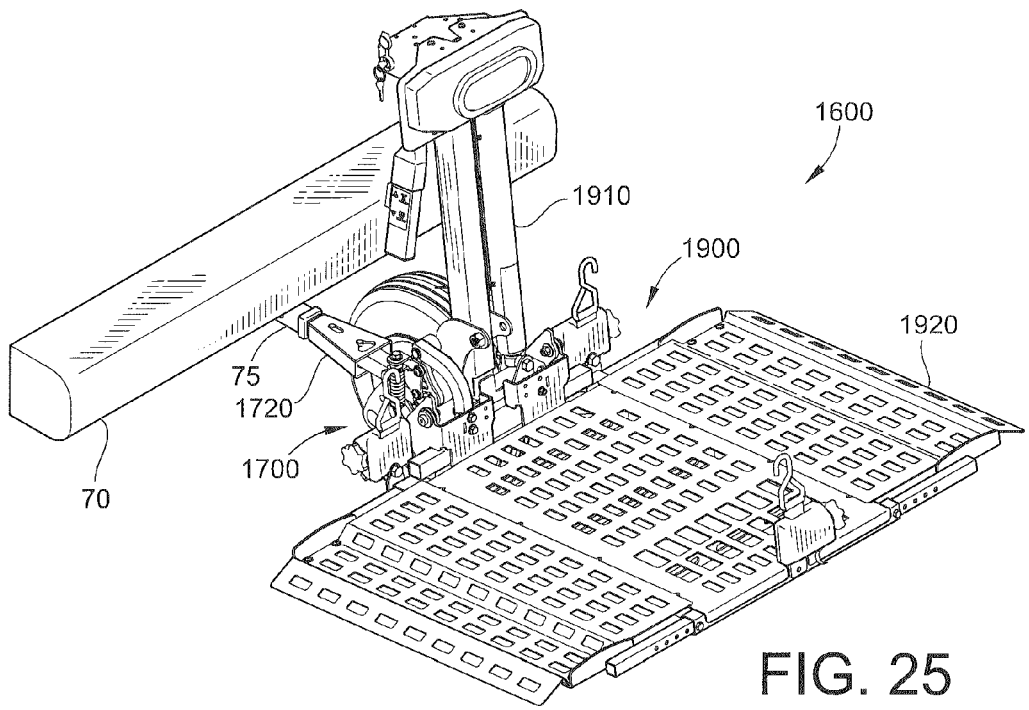
FIG. 25 is a perspective view of a platform lift trailer mounted to a motor vehicle, with the platform in a lowered position.

As seen in one or more other embodiments shown in FIGS. 16A-24, a platform lift trailer 1100 includes a mounting plate 1200 that is configured to be mounted to a motor vehicle using a hitch tongue assembly 1300 that has a hitch tongue 1330 configured to engage a conventional receiver hitch socket (e.g., socket 75 on a motor vehicle 70, as shown in FIG. 22). Hitch tongue assembly 1300 can be bolted and/or welded to mounting plate 1200 or affixed thereto in any other appropriate manner. Hitch tongue assembly 1300 may be adjustable, for example having height adjustment facilitated by telescoping mounting tubes 1340.

Figure 32:
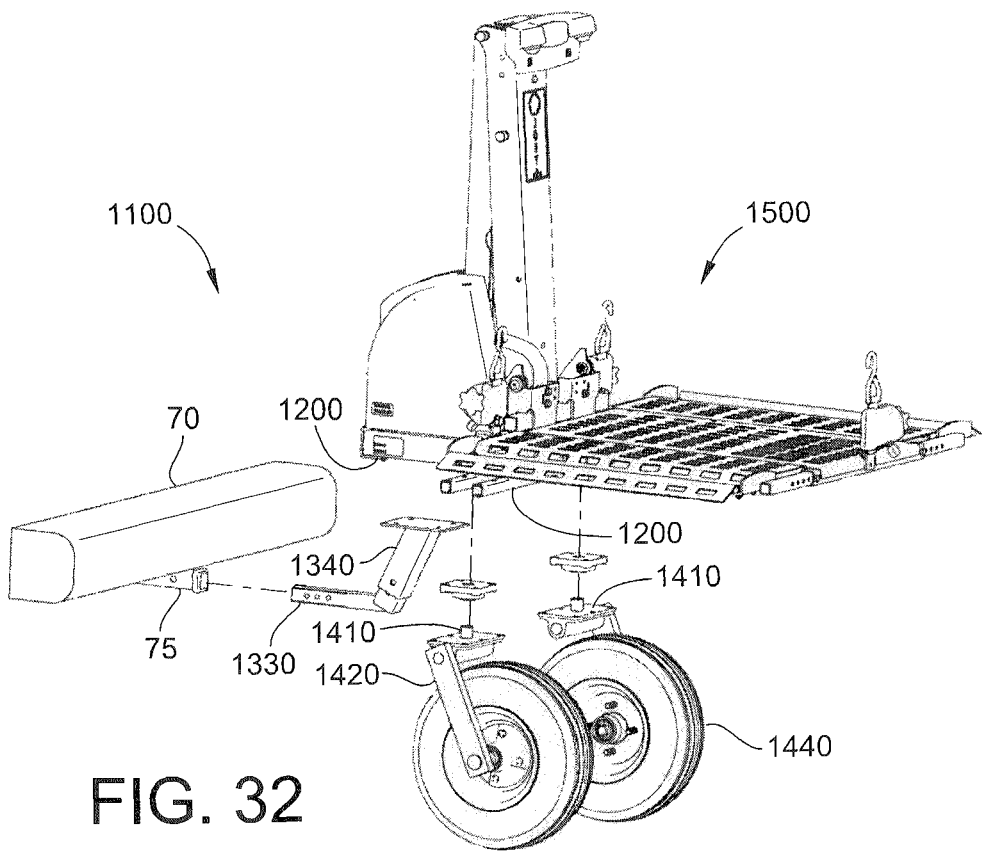
FIG. 32 is an exploded view of a two-caster platform lift trailer.
Figure 33:
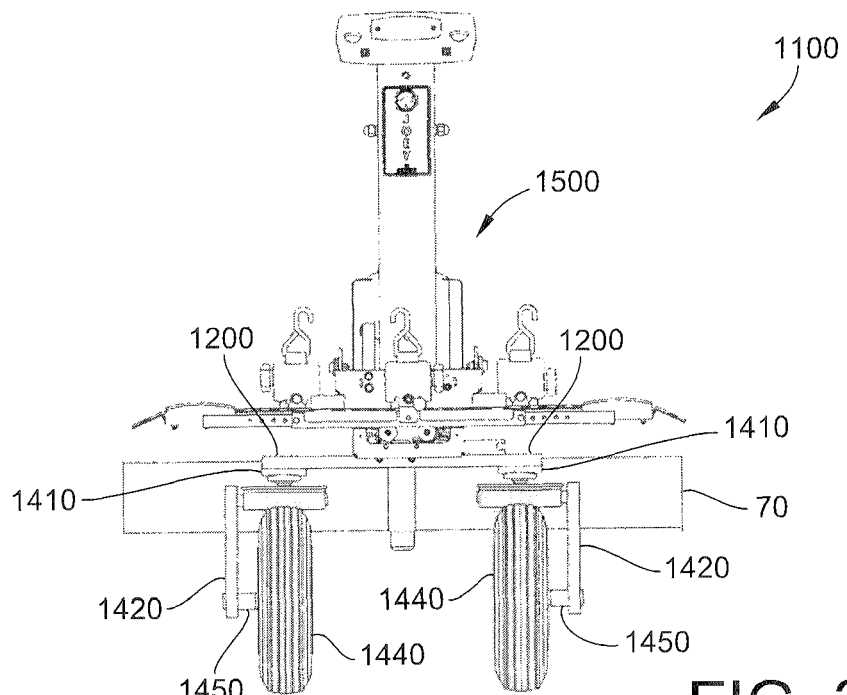
FIG. 33 is a rear view of a two-caster platform lift trailer.

A caster assembly 1400 is mounted to the underside of mounting plate 1200, for example by bolting plate 1200 to a swivel mount 1410, thus coupling a wheel support 1420 to plate 1200. Wheel support 1420 can be a single member bracket as shown in some embodiments of the Figures or can be use multiple members to couple one or more caster wheels 1440 to mounting plate 1200 (FIGS. 32 and 33 illustrate one or more additional two-wheel embodiments of a platform lift trailer). The swivel allows wheel(s) 1440 to turn as needed during use. Wheel(s) 1440 are mounted to wheel support 1420 using an axle 1450, which may be of conventional configuration or may be specially configured to accommodate structures provided to stabilize and/or improve operation of device 1100 during higher speed operation on a highway or the like.

As above, some embodiments of the lift assembly 1500 shown in FIGS. 16A-24 can include a four bar linkage lift. The four bar (parallelogram) linkage 1510 is driven by an actuator and/or cylinder configuration 1512 extending from a hood 1570 or the like and allows the lift device platform 1520 be extended laterally (horizontally) and downward for loading, as shown in FIGS. 16A-24. This "out and down" motion defines an arc or other travel path for the lift platform 1520 around the caster wheel(s) 1440. By using this configuration, some embodiments of the platform lift trailer 1100 provide a very compact configuration that is especially more compact in an unloaded storage position, as shown in FIG. 22. Also, as noted above, caster wheel assembly 1400 is positioned to swivel 360° within and between and/or within the hitch tongue assembly 1300 and the travel path of platform 1520 of the lift assembly 1500. This configuration allows full swiveling of the caster wheel(s) 1440 while maintaining the very compact overall design.

Further embodiments of the present invention are shown in FIGS. 25-31, in which a platform lift trailer 1600 is mounted to a motor vehicle 70. A mounting assembly 1700 includes a hitch tongue assembly having a hitch tongue 1710 with an angular adaptor 1720 that permits some lateral angular adjustment. A mobility device lift 1900 is mounted to the hitch tongue assembly with a pair of brackets 1730, 1740. Bracket 1730 is crescent-shaped to permit adjustability as to the angle of a mounted lift 1900 as well as its height.

Figure 26:
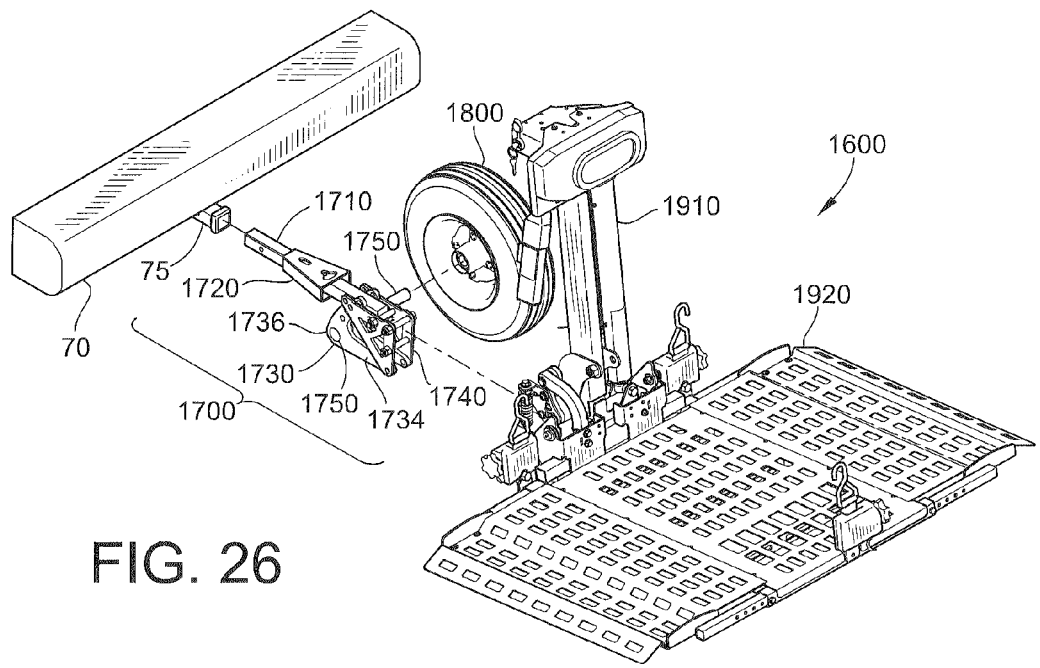
FIG. 26 is a perspective exploded view of a platform lift trailer mounted to a motor vehicle, with the platform is in a lowered position.
Figure 27:
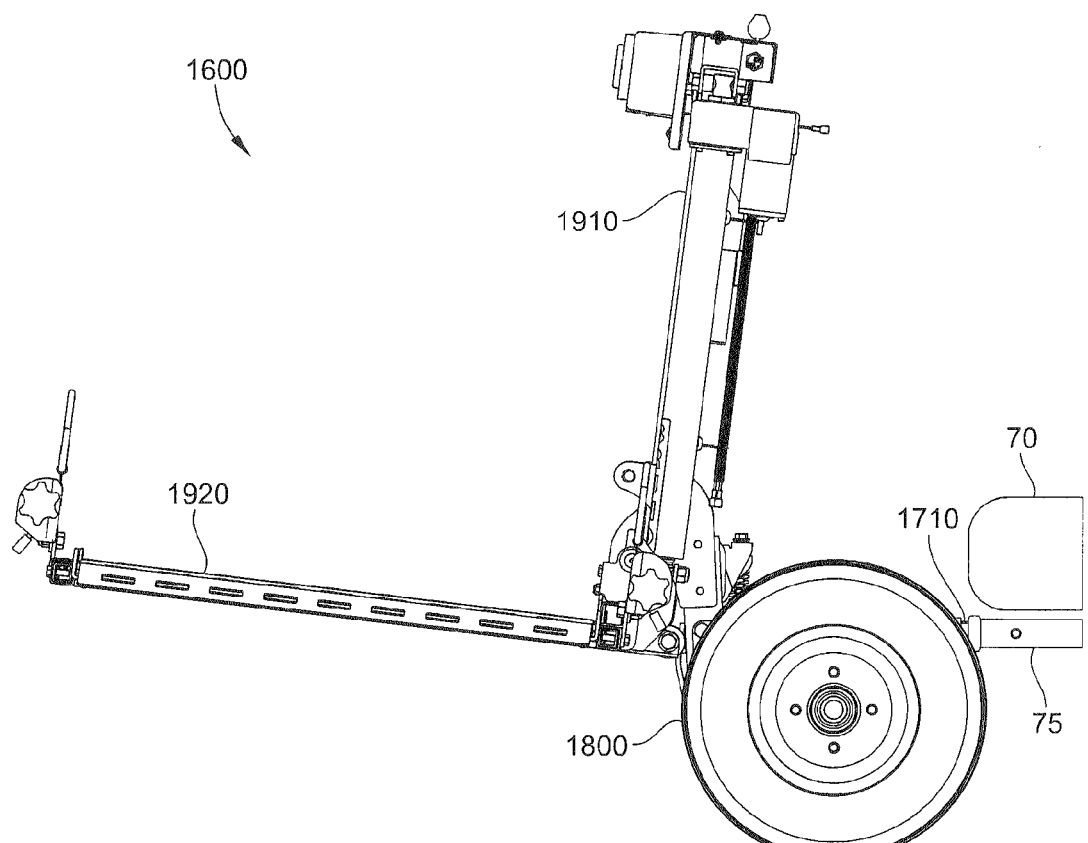
FIG. 27 is a side view of a platform lift trailer mounted to a motor vehicle, with the platform in a raised and open position.
Figure 28:
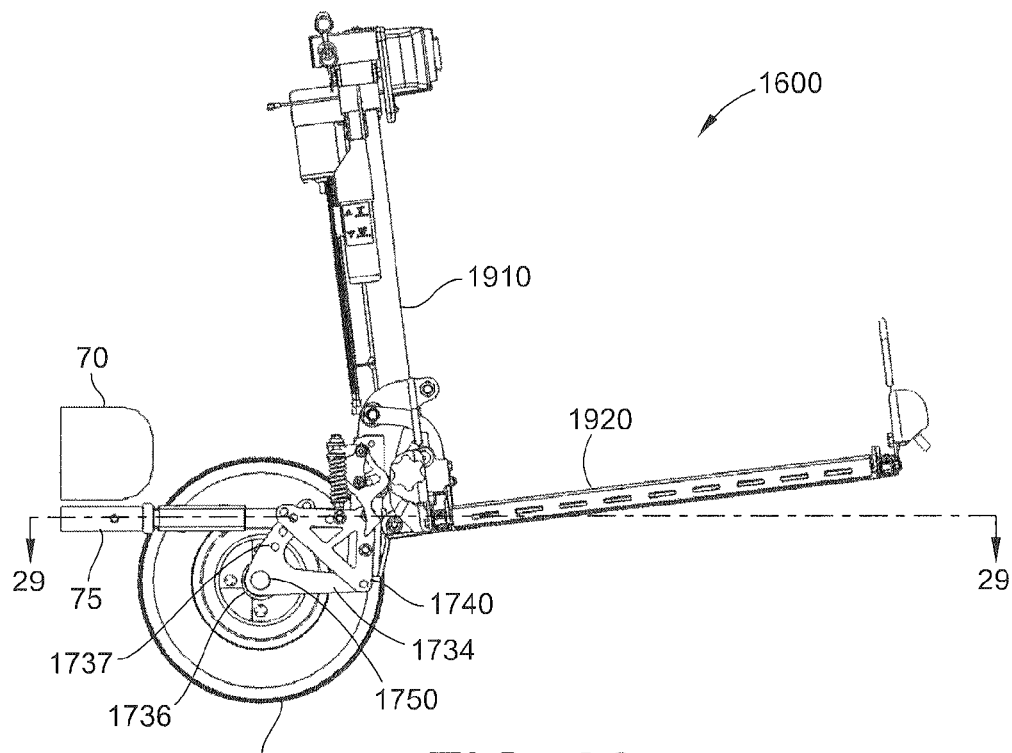
FIG. 28 is a side view of a platform lift trailer mounted to a motor vehicle, with the platform in a raised and open position.
Figure 29:
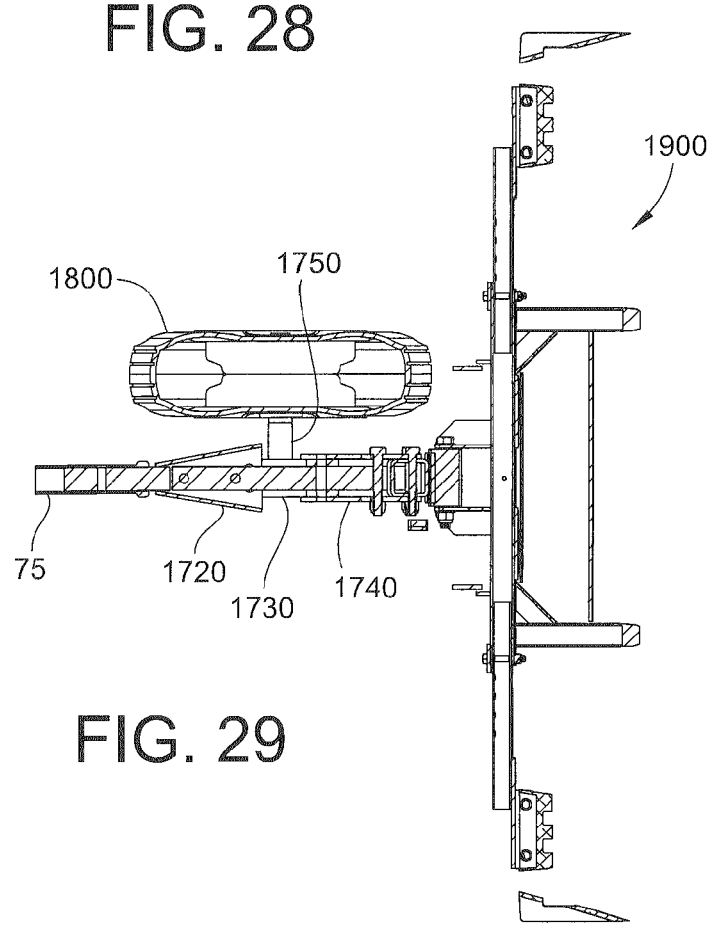
FIG. 29 is a cross-sectional view of a platform lift trailer with the platform in a raised and open position, taken along the line 29-29 of FIG. 28.
Figure 30:
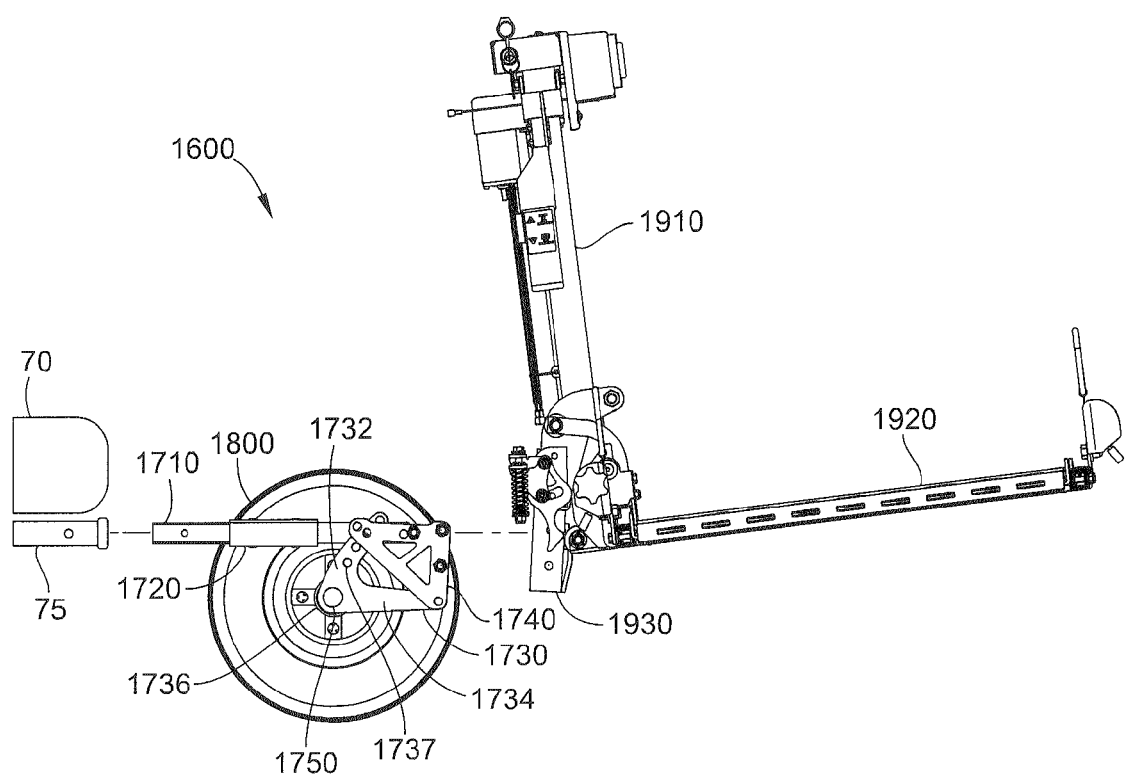
FIG. 30 is a side exploded view of a platform lift trailer mounted to a motor vehicle with the platform in a raised and open position.
Figure 31:
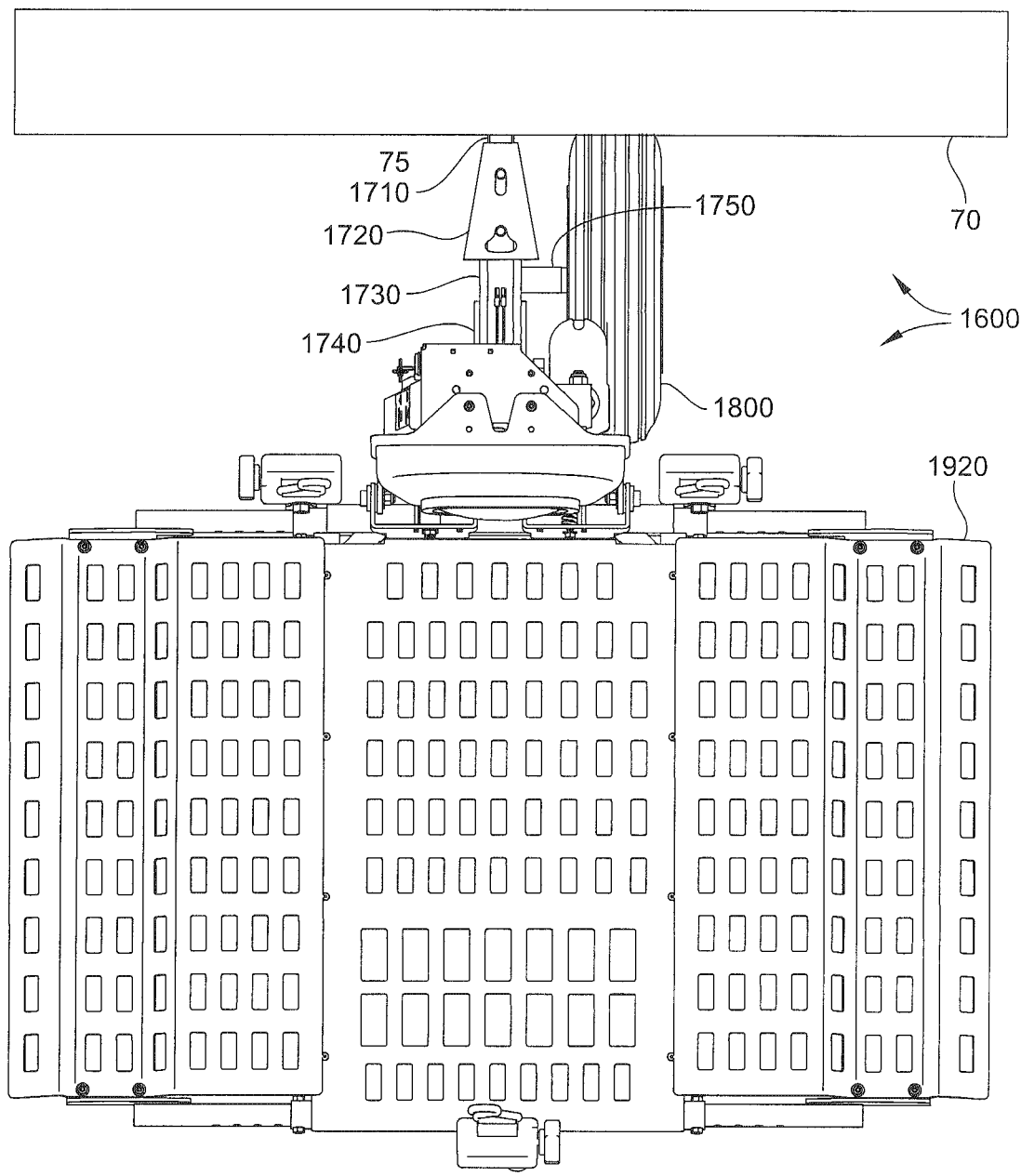
FIG. 31 is a top view of a platform lift trailer mounted to a motor vehicle with the platform in a lowered position.

The crescent shape of bracket 1730 includes a somewhat vertical branch 1732, a horizontal branch 1734 and a bend 1736 connecting the vertical and horizontal branches 1732, 1734. Horizontal branch 1734 has a mounting hole near its end for coupling the lower corner of triangular bracket 1740, as seen in FIG. 30. As seen in FIGS. 26, 28 and 30, the somewhat vertical branch 1732 of bracket 1730 has a plurality of holes 1737 that permit another corner of bracket 1740 to be affixed in an adjustable manner, as will be appreciated by those skilled in the art. The bend 1736 of bracket 1730 holds an axle 1750 for one or more caster wheels 1800. Bracket 1740, in addition to having bracket 1730 mounted to it, also has the lift device 1900 affixed to two or more points on bracket 1740, as seen in FIG. 30. Lift device 1900 has a mounting bracket 1930 that typically is used to mount the device to any supporting structure.

Lift 1900 uses only vertical motion, provided by actuator system 1910, to raise and lower lift platform 1920. Because a vertical-only lift device does not provide horizontal/lateral movement of platform 1920, the lift must be mounted in a position allowing platform 1920 and the remainder of lift 1900 to stay clear of wheel 1800 and any other structure that might interfere with operation of lift 1900 and/or the caster-supported structure of caster-supported lift 1600. In other embodiments, as noted above, a lift may have separate horizontal-motion apparatus to extend and retract platform 1920 and vertical actuator 1910, as seen in various lifts common in the mobility device field. A number of lift devices are well known to those skilled in the art and can be used in connection with embodiments of the present invention.

The embodiments of FIGS. 25-31 do not provide a swivel, per se, for any wheel(s) 1800, though such accommodation can be made as will be appreciated by those skilled in the art. When a swivel structure is introduced to embodiments such as those shown in FIGS. 25-31, the additional required structure can add substantial undesirable length to the caster-supported apparatus (e.g., 48 inches or more). The lift platform 1920 in some embodiments can be folded in a manner analogous to that shown in FIG. 22.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A platform lift trailer comprising:
   a chassis comprising a transverse support beam and a lift mounting bracket mounted to the beam;
   a motor vehicle coupler mounted to the chassis, wherein the motor vehicle coupler comprises a hitch bar connector configured to engage a conventional receiver hitch socket of a motor vehicle;
   a first caster assembly mounted to the beam and a second caster assembly mounted to the beam and laterally spaced apart from the first caster assembly, each caster assembly comprising:

a tire mounted to a suspension apparatus by a tire mounting bracket; and a swivel mounting apparatus coupling the suspension apparatus to the beam to permit 360° swiveling of the tire and the suspension apparatus relative to the beam;

wherein the suspension apparatus comprises a tubular suspension housing mounted to the swivel mounting apparatus and a torsion shaft coupled to the tire mounting bracket and extending coaxially through the tubular suspension housing in which the torsion shaft rotates, wherein cushioning elements within the suspension housing resist rotation of the torsion shaft generated by movement of the tire or the chassis transmitted through the tire mounting bracket; and a personal mobility device lift mounted to the lift mounting bracket, wherein the lift comprises:

a platform movable between an open stored position and a fully deployed position that is vertically lower and horizontally displaced from the open stored position; and control apparatus for controlling operation of the lift;

wherein the first and second caster assemblies are located beneath the platform when the platform is in the open stored position.

2. The platform lift trailer of claim 1 wherein the platform is foldable between the open stored position and a folded stored position.

3. The platform lift trailer of claim 2 wherein the lift platform comprises at least one of the following:

hold-down straps;

a personal mobility device docking system.

4. The platform lift trailer of claim 3 wherein the personal mobility device lift comprises a four bar linkage mechanism for moving the lift platform vertically and horizontally in an arc around the tires of the first and second caster assemblies.

5. The platform lift trailer of claim 1 wherein the personal mobility device lift comprises at least one of the following:

a four bar linkage mechanism for moving the lift platform vertically and horizontally;

a two-stage platform movement mechanism comprising a vertical movement mechanism for raising and lowering the lift platform vertically and a horizontal movement mechanism configured to extend and retract the lift platform horizontally.

6. The platform lift trailer of claim 1 wherein the coupler is configured to provide a laterally rigid connection between the chassis and a motor vehicle to which the trailer is coupled.

7. The platform lift trailer of claim 6 wherein the coupler is further configured to limit vertical angular displacement resulting from torsional forces applied between the trailer and a motor vehicle to which the trailer is coupled.

8. The platform lift trailer of claim 7 wherein the coupler is further configured to resist torsional forces applied due to vertical angular displacement between the trailer and a motor vehicle to which the trailer is coupled.

9. The platform lift trailer of claim 8 wherein the personal mobility device lift comprises a four bar linkage mechanism for moving the lift platform in an arc vertically and horizontally.

10. A platform lift trailer comprising:

a chassis and a motor vehicle coupler mounted to the chassis, wherein the motor vehicle coupler is configured to provide a laterally rigid connection between the chassis and a motor vehicle, further wherein the motor vehicle coupler comprises a hitch bar connector configured to engage a conventional motor vehicle receiver hitch socket;

first and second spaced apart caster assemblies mounted to the underside of the chassis, each caster assembly comprising:

a highway-suitable tire mounted to a suspension apparatus by a tire mounting bracket; and a swivel mounting apparatus coupling the suspension apparatus to the chassis to permit swiveling of the tire and the suspension apparatus relative to the chassis;

wherein the suspension apparatus comprises a torsion shaft configured to resist movement of the tire or the chassis transmitted through the tire mounting bracket; and a personal mobility device lift mounted to the chassis, wherein the lift comprises:

a planar platform movable between an open stored position and a fully deployed position that is vertically lower and horizontally displaced from the open stored position;

wherein, when the platform is in the open stored position, the first and second caster assemblies are located beneath and not wider than the platform.

11. The platform lift trailer of claim 10 wherein the personal mobility device lift comprises a four bar linkage mechanism for moving the lift platform vertically and horizontally.

12. The platform lift trailer of claim 11 wherein the platform is foldable between the open stored position and a folded stored position.

13. The platform lift trailer of claim 12 wherein the platform comprises at least one of the following: hold-down straps; a personal mobility device docking system.

14. The platform lift trailer of claim 13 wherein the coupler is a torque-limiting motor vehicle coupler comprising biasing means for resisting vertical angular displacement between the trailer and a motor vehicle to which the trailer is coupled.

15. A platform lift trailer comprising:

a chassis comprising a transverse support beam and a lift mounting bracket mounted to the beam;

a motor vehicle coupler mounted to the chassis, wherein the coupler is configured to permit limited vertical angular displacement between the chassis and a motor vehicle to which the trailer is coupled and further to provide a laterally rigid connection between the chassis and a motor vehicle to which the trailer is coupled;

first and second laterally spaced apart caster assemblies mounted beneath the beam, each caster assembly comprising:

a highway-suitable tire mounted to a tire mounting bracket;

a swivel mounting apparatus coupled to the beam to permit 360° swiveling of the tire relative to the beam; and a suspension apparatus coupling the tire mounting bracket to the swivel mounting apparatus and comprising a torsion shaft coupled to the tire mounting bracket, wherein the torsion shaft extends coaxially through a suspension housing in which the torsion shaft is rotatable, wherein a plurality of cushioning elements within the suspension housing resist rotation of the torsion shaft generated by relative movement between the tire and the chassis; and a personal mobility device lift mounted to the lift mounting bracket, wherein the lift comprises:

a foldable platform configured to hold a personal mobility device when the platform is in an open stored position, the platform movable between the open stored position and a fully deployed position that is vertically lower and horizontally displaced from the open stored position;

a four bar linkage to which the platform is mounted, the four bar linkage moving the platform vertically and horizontally in an arc around the tires of the first and second caster assemblies; and control apparatus for controlling operation of the lift;

wherein the platform is above the first and second caster assemblies when the platform is in the open stored position.

16. The platform lift trailer of claim 15 wherein the coupler comprises biasing means urging the coupler into a static position in which there is no vertical angular displacement between the trailer and a motor vehicle to which the trailer is coupled.

* * * * *